United States Patent
Kano et al.

(10) Patent No.: US 7,147,027 B2
(45) Date of Patent: Dec. 12, 2006

(54) PLATE FOR HOT PRESSING, HOT PRESS DEVICE, AND CARD MANUFACTURING DEVICE

(75) Inventors: Kenichi Kano, Miyagi (JP); Kimitaka Nishimura, Miyagi (JP)

(73) Assignee: Sony Corporation, Tokyo (JP)

( * ) Notice: Subject to any disclaimer, the term of this patent is extended or adjusted under 35 U.S.C. 154(b) by 106 days.

(21) Appl. No.: 10/297,458

(22) PCT Filed: Apr. 5, 2002

(86) PCT No.: PCT/JP02/03451

§ 371 (c)(1),
(2), (4) Date: Jun. 2, 2003

(87) PCT Pub. No.: WO02/081186

PCT Pub. Date: Oct. 17, 2002

(65) Prior Publication Data

US 2004/0011225 A1 Jan. 22, 2004

(51) Int. Cl.
*B30B 15/34* (2006.01)

(52) U.S. Cl. ............. 156/382; 156/498; 156/583.1
(58) Field of Classification Search ............. 156/228, 156/285, 286, 382, 498, 538, 539, 580, 581, 156/583.1; 100/315, 137, 196, 207
See application file for complete search history.

(56) References Cited

U.S. PATENT DOCUMENTS

| | | | | |
|---|---|---|---|---|
| 3,047,051 A | * | 7/1962 | Matveeff | 156/539 |
| 3,598,684 A | * | 8/1971 | Militana et al. | 156/538 |
| 3,870,582 A | * | 3/1975 | Brackett et al. | 156/383 |
| 4,199,391 A | * | 4/1980 | Andrews | 156/324.4 |
| 5,470,428 A | | 11/1995 | Sanko | |
| 5,472,556 A | * | 12/1995 | Sanko | 156/498 |
| 5,641,370 A | * | 6/1997 | Sanko | 156/228 |
| 5,641,371 A | * | 6/1997 | Sanko | 156/228 |
| 5,762,752 A | * | 6/1998 | Sawano et al. | 156/580 |
| 6,099,771 A | * | 8/2000 | Hudkins et al. | 264/102 |
| 6,146,490 A | * | 11/2000 | Ensign | 156/324.4 |

FOREIGN PATENT DOCUMENTS

| | | |
|---|---|---|
| JP | 59-206200 | 11/1984 |
| JP | 63-141730 | 9/1988 |
| JP | 2000-43068 | 2/2000 |
| JP | 2000-292056 | 10/2000 |

OTHER PUBLICATIONS

Australian Patent Office Examination Report, Application No. SG200207393–0, dated Dec. 17, 2003.

* cited by examiner

*Primary Examiner*—James Sells
(74) *Attorney, Agent, or Firm*—Sonnenschein, Nath & Rosenthal LLP

(57) ABSTRACT

A plate for hot pressing capable of keeping the degree of vacuum of its inside in the form of being separated from a deaeration apparatus, a hot press apparatus having press sections the alteration of the arrangement layout of which is easy, and a card manufacturing apparatus capable of manufacturing various kinds of cards by itself are provided. A plate for hot pressing (101) is provided with a check valve device (101*h*) for keeping a vacuum state inside a base material accommodating section (101*c*) formed between a pair of plate members (101*a*) and (101*b*), and respective press sections (103A)–(103C), (104A) and (104B) constituting lamination sections (103) and (104) are arranged in series respectively. Conveyance rails (108A) and (108B) for conveying the plate for hot pressing (101) are disposed doubly on an upper side and a lower side, and conveyance means (118A), (118B), (151A) and (151B) conveying the plate for hot pressing (101) cyclically are provided.

12 Claims, 19 Drawing Sheets

US 7,147,027 B2

PLATE FOR HOT PRESSING, HOT PRESS DEVICE, AND CARD MANUFACTURING DEVICE

BACKGROUND OF THE INVENTION

The present invention relates to a plate for hot pressing which is suitable for being used for a process of collating and laminating base materials constituting a contactless type IC card to perform their thermo-compression bonding. The present invention further relates to a hot press apparatus and a card manufacturing apparatus.

A contactless type IC card (hereinafter, referred to as an IC card simply) has been conventionally known. A signal can be read from and written in the IC card by the use of a radio wave or the like. The IC card can communicate with a system in the state of being put in a pocket or a bag. The IC card is composed of a laminated body of a plurality of card constituting base materials laminated on one another. An example of its construction is shown in FIG. 19. An IC card 1 is formed by the thermo-compression bonding of at least packaging materials 9a and 9b and the like on both sides of an antenna substrate 3 on which an IC chip 2 is mounted.

The IC chip 2 is adhered at a prescribed position on the antenna substrate 3 with heat, e.g. of 180° C. to 250° C., and a contact pressure, e.g. of 800 g, with an anisotropic conductive film 5 put between the IC chip 2 and the antenna substrate 3. A bump (not shown) formed on an under surface of the IC chip 2 is electrically connected to a circuit pattern on the antenna substrate 3. The sealing of the bonded IC chip 2 is processed with sealing materials 6a and 6b, and thereby conduction property of the IC chip 2 is ensured. As the sealing materials 6a and 6b, an epoxy thermosetting adhesive containing 10% of filler is generally used. Moreover, with an object of protecting the IC chip 2 solidified with the sealing materials 6a and 6b, the top surface and the under surface of the IC chip 2 is reinforced by being nipped with reinforcing plates 7a and 7b made of stainless steel or the like. An upper packaging material 9a and a lower packaging material 9b are respectively adhered on the top surface and the under surface of the antenna substrate 3, on which the assembling of the IC chip 2 has been completed, with heat, e.g. of 100° C. to 200° C., and a pressure, e.g. of one ton per a card, with adhesive layers 8a and 8b between the packaging materials 9a and 9b and the reinforcing plates 7a and 7b, respectively. Thereby, a laminated body (solid white card) C1 of them is made. The antenna substrate 3 and the upper and the lower packaging materials 9a and 9b are considered to be base constituting materials of the IC card 1.

After that, magnetic stripe layers 10a and 10b, magnetic stripe masking layers 11a and 11b, printing ink layers 12a and 12b, and the like are bonded by thermo-compression bonding as the need arises. Thereby, a completed card body C2 is manufactured. Then, the card body C2 is made to be the IC card 1 through an external form punching process to a standard size based on the IC chip 2 (FIG. 20).

Now, a large sized vacuum multistage press has conventionally been used for manufacturing the IC card 1 constructed as mentioned above. In the vacuum multistage pressing system, an IC card constituting base material on which the antenna substrate 3 having the IC chip 2 installed thereon and the packaging materials 9a and 9b are located and collated in the order of laminating is loaded into a pressing machine disposed in a vacuum chamber of a large size, and the inside of the vacuum chamber is drawn to vacuum up to a prescribed pressure. After that, each process of preheating processing, thermo-compression bonding processing and cooling processing is executed, and thereby a plurality of IC cards is manufactured at a time.

In the vacuum multistage pressing system, a cycle from deaeration of the inside of the vacuum chamber to rise in temperature and cooling of the pressing machine needs a long time. Accordingly, six sets to twelve sets of IC card constituting base materials on which, for example, sheets having a size of 18 card surfaces (almost A3 size) are collated and laminated are loaded into the vacuum chamber at a time to increase a stocking quantity. Thereby, productivity is secured.

In thermo-compression bonding of a laminated body of a plurality of constituent base materials such as the IC card 1, it is very important to eliminate air remaining between each constituent base material as much as possible. In the case where vacuum deaeration is incomplete, for example, as shown in FIG. 21A and FIG. 21B, standing air 13 and 14 formed around the IC chip 2 and the other places is dispersed into all directions and then is compressed at the time of the thermo-compression bonding. There may be a case where deaeration paths to the outside of the card disappear owing to hot press fusion of the adhesive layers 8a and 8b (FIG. 19) and dispersed air bubbles are confined within the card. As a result, voids (not adhered region) 15 shown in FIGS. 22A and 22B occur on a surface of the card after the thermo-compression bonding. The voids 15 cause a bad outward appearance of the card. Moreover, if the voids 15 are located at a cutting layer of the most external shape of the punching of the card, there is the possibility of exfoliation of the packaging materials 9a and 9b owing to the decrease of adhesive strength.

That is, the above-mentioned vacuum multistage pressing system not only needs a long time for the deaeration within the vacuum chamber, but also sometimes produces void faults owing to the insufficiency of the deaeration despite the long time deaeration processing.

Moreover, the vacuum multistage pressing system makes the pressing machine in the vacuum chamber bear a heating function and a cooling function to execute each process of preheating, thermo-compression bonding and cooling continuously. However, its manufacturing cycle time until the lamination and the adhesion of the card constituting base materials have been finished is long, and then the vacuum multistage pressing system has weakness of securing its productivity and its mass productivity. Moreover, the vacuum multistage pressing system has a problem of being not good in its economical efficiency because its consumption energy becomes vast owing to its rapid heating and rapid cooling of the pressing machine.

For solving such problems, a plate for hot pressing 20 shown in FIG. 23 is disclosed in Japanese Patent Application Laid-Open Publication No. 2000-182014. As shown in FIG. 23, in the plate for hot pressing 20, a collated and laminated plurality of card constituting base materials C is nipped by a pair of plate members 21a and 21b on its top surface and its under surface, respectively. And, a deaeration hose 24 communicating with a deaeration apparatus 23 is connected to an annular hollow ring section 22 formed at outer periphery portions of the nipped surfaces. The plate for hot pressing 20 has the construction in which the upper plate member 21a is superposed on the lower plate member 21b fixed to each end of a cross-shaped arm member 30, as shown in FIG. 24, with a sealing member 25 between the upper and the lower plate members 21a and 21b. Japanese Patent Application Laid-Open Publication No. 2000-182014 is constructed to arrange each plate for hot pressing 20 in order by divided rotation driving of an arm member 30 by the 90 degrees at a preheating press section 26, a hot press section 27, a cooling press section 28, and a waiting section 29 which the base material C is supplied to and ejected from by a transferring mechanism 31.

By the construction, because only the deaeration processing of the space between the upper and the lower plate members 21a and 21b which has a small space capacity is performed, a desired degree of vacuum can be obtained in a short time, and thereby the decrease of void faults can be achieved. Moreover, because the plate for hot pressing 20 is conveyed in order to each of the press sections 26–28 kept at prescribed temperatures respectively, its card manufacturing cycle time is shortened in comparison with that of a conventional vacuum multistage pressing system. Consequently, the improvement of its productivity and its mass productivity can be achieved, and further its energy-saving property is also improved.

However, the hollow annular ring 22 is constructed as the deaeration path in the construction of the conventional plate for hot pressing 20 having the above-mentioned construction, the escape of residual air by deformations should be secured by forming the board thicknesses of the nipped surfaces of each of the plate members 21a and 21b to be thin of about 1 mm. Consequently, when a high vacuum state is aimed, the deformations of the nipped surfaces are actualized. Hence, not only it becomes impossible to perform an appropriate hot press operation, but also there is the possibility that collation precision goes wrong owing to the deformations of the nipped surfaces. Moreover, the conventional construction has the problem of obliged restriction of the degree of freedom of designing apparatus because the deaeration hose 24 should follow to the conveyance of the plate for hot pressing 20 for keeping the vacuum pressure in the inside of the plate for hot pressing 20.

On the other hand, if the construction is noticed from the point of view of a hot press apparatus, because each of the press sections 26–28 of preheating, heating and cooling are arranged in a cluster-like state severally, it is impossible to deal with the increase of press sections, e.g. the formation of the preheating press section to be multistage, quickly. Consequently, it is very difficult to manufacture various laminated bodies appropriately in accordance with combinations of base material components.

Moreover, if the construction is noticed from the point of view of a card manufacturing apparatus, because the conveyance path of the plate for hot pressing 20 is planar, it is also impossible to install a plurality of couples of heating/cooling press sections for manufacturing various kinds of cards by the use of an apparatus in addition to the above-mentioned problems. That is, the construction is a construction disparate from a card manufacturing apparatus which can cope with various kinds and is small in size and cheap in price to have an introducing effect, all being required in the present manufacturing sites.

The present invention was made in view of the above-mentioned problems. An object of the present invention is to provide a plate for hot pressing capable of keeping the degree of vacuum in the inside thereof in the form of being separated from a deaeration apparatus while securing an appropriate hot press operation.

Moreover, it is another object of the present invention to provide a hot press apparatus which can cope with alterations of the arrangement layouts of press sections and additions of the press sections flexibly to manufacture various laminated bodies appropriately.

Moreover, it is a further object of the present invention to provide a card manufacturing apparatus which can manufacture various kinds of cards by the use of a single apparatus.

SUMMARY OF THE INVENTION

At the time of solving the above-mentioned problems, a plate for hot pressing of the present invention is characterized by comprising: a pair of plate members on an upper side and a lower side; an annular sealing member installed between the pair of plate members, the annular sealing member forming a base material accommodating section accommodating base materials therein; an exhaust passage having one end opened to the base material accommodating section and another end opposed to outsides of the plate members; and a check valve device connected to the other end of the exhaust passage for prohibiting invasion of outside air into the base material accommodating section.

By the construction, the vacuum pumping of the base material accommodating section can be realized without deformation of the plate member, and a degree of vacuum of the base material accommodating section can be kept by the function of the check valve device. Consequently, the plate for hot pressing can be conveyed in the state of being separated from the deaeration apparatus.

Moreover, a hot press apparatus according to the present invention is characterized in that: a plate for hot pressing is provided with a check valve device for keeping a vacuum state in a base material accommodating section formed between a pair of plate members; and a preheating press section for performing preheating processing, a hot press section for performing hot press processing, and a cooling press section for performing cooling processing are mutually arranged in a serial state.

By the construction, because the conveyance of the plate for hot pressing to each press section after a deaeration process can be preformed in the form of being separated from a deaeration apparatus, the degree of freedom of designing apparatus can greatly be improved. And, because each press section is arranged in series, the hot press apparatus can sufficiently cope with an alteration of the arrangement layout of the press sections and additions of the press sections, and it becomes possible to manufacture various laminated bodies appropriately.

Moreover, a card manufacturing apparatus according to the present invention is characterized in that: a plate for hot pressing is provided with a check valve device for keeping a vacuum state inside of a base material accommodating section formed between a pair of plate members; and the apparatus include: conveyance means for cyclically conveying the plate for hot pressing between upper and lower double conveyance rails; a base material supply section for collating and laminating a plurality of card constituting base materials between the pair of plate members; a lamination section for manufacturing a laminated body of the card constituting base materials by performing prescribed hot press processing of the plate for hot pressing for accommodating the laminated card constituting base materials; and a card takeout section for taking out the laminated body subjected to the hot press processing from the plate for hot pressing.

That is, in the construction of the present invention, in addition to the above-mentioned operations and effects, a conveyance path of the plate for hot pressing is formed in three dimensions, and the plate for hot pressing is cyclically conveyed. Consequently, the degree of freedom for arranging the base material supply section, the lamination section and the card takeout section arbitrary is heightened. Furthermore, various kinds of cards can be made by the use of an apparatus.

BRIEF DESCRIPTION OF DRAWINGS

FIG. 8A shows a state before a press and FIG. 8B shows a state at the time of the press;

FIG. 11A shows a state of receiving a plate for hot pressing from an upper conveyance rail, FIG. 11B shows a state of lowering the plate for hot pressing on a lower conveyance rail, and FIG. 11C shows a state of transferring the plate for hot pressing to the lower conveyance rail, respectively;

FIG. 18A shows a valve closing state and FIG. 18B shows a valve opening state;

BEST MODE FOR CARRYING OUT THE INVENTION

Hereinafter, an embodiment of the present invention will be described with reference to the attached drawings.

Figure 1:
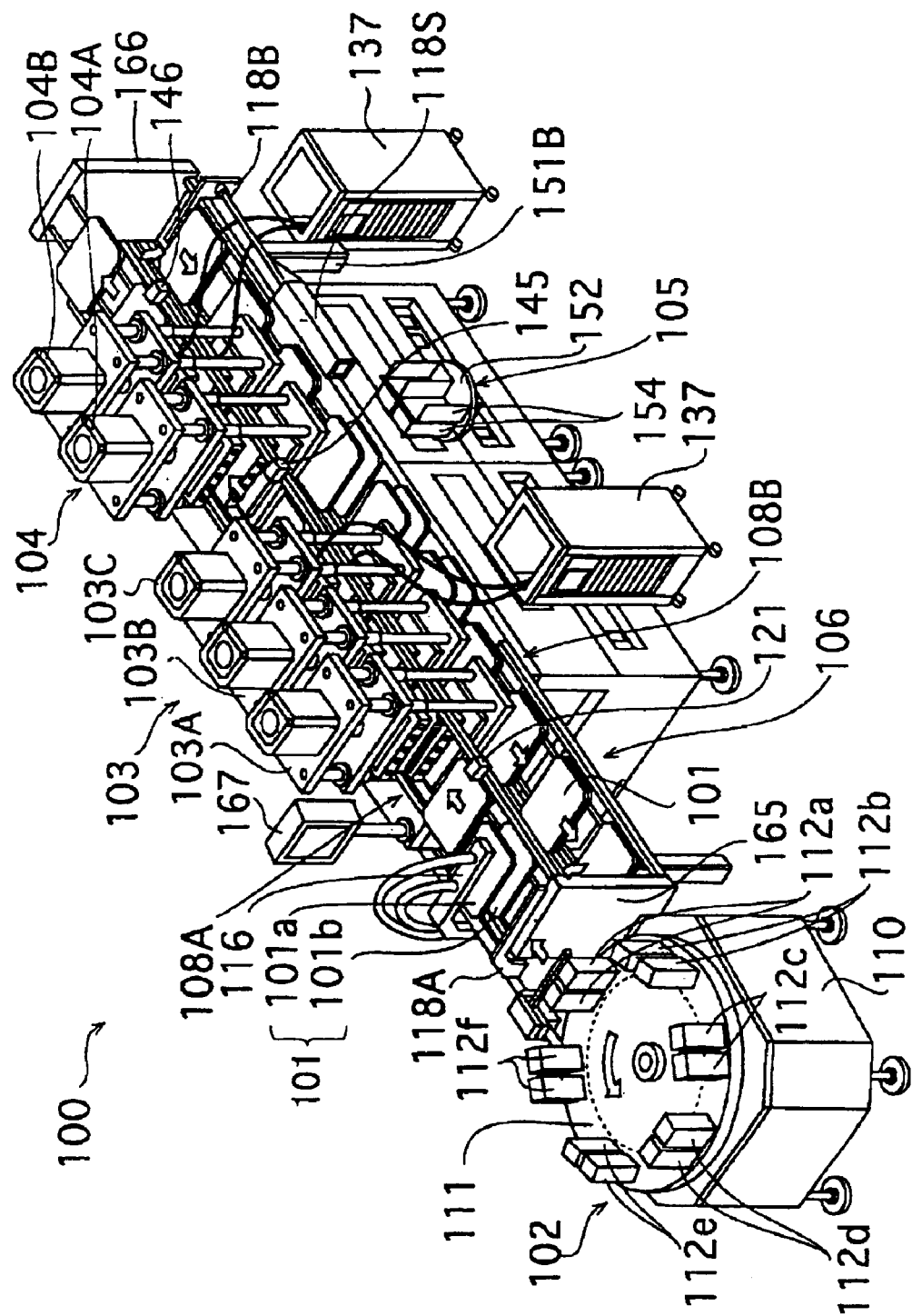
FIG. 1 is a perspective view showing the whole of a card manufacturing apparatus according to an embodiment of the present invention.
Figure 19:
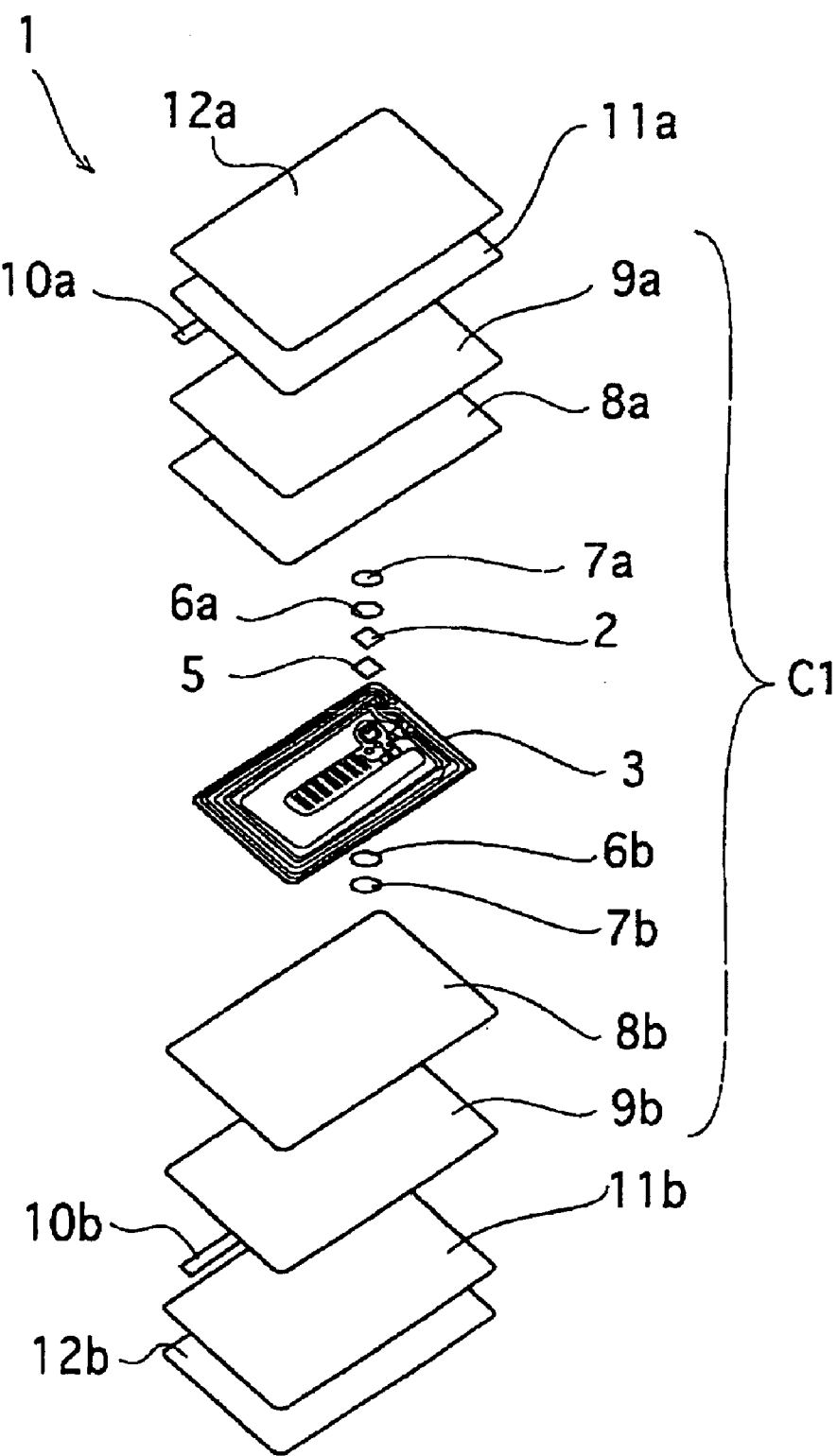
FIG. 19 is an exploded perspective view showing an example of the construction of a contactless type IC card.
Figure 20:
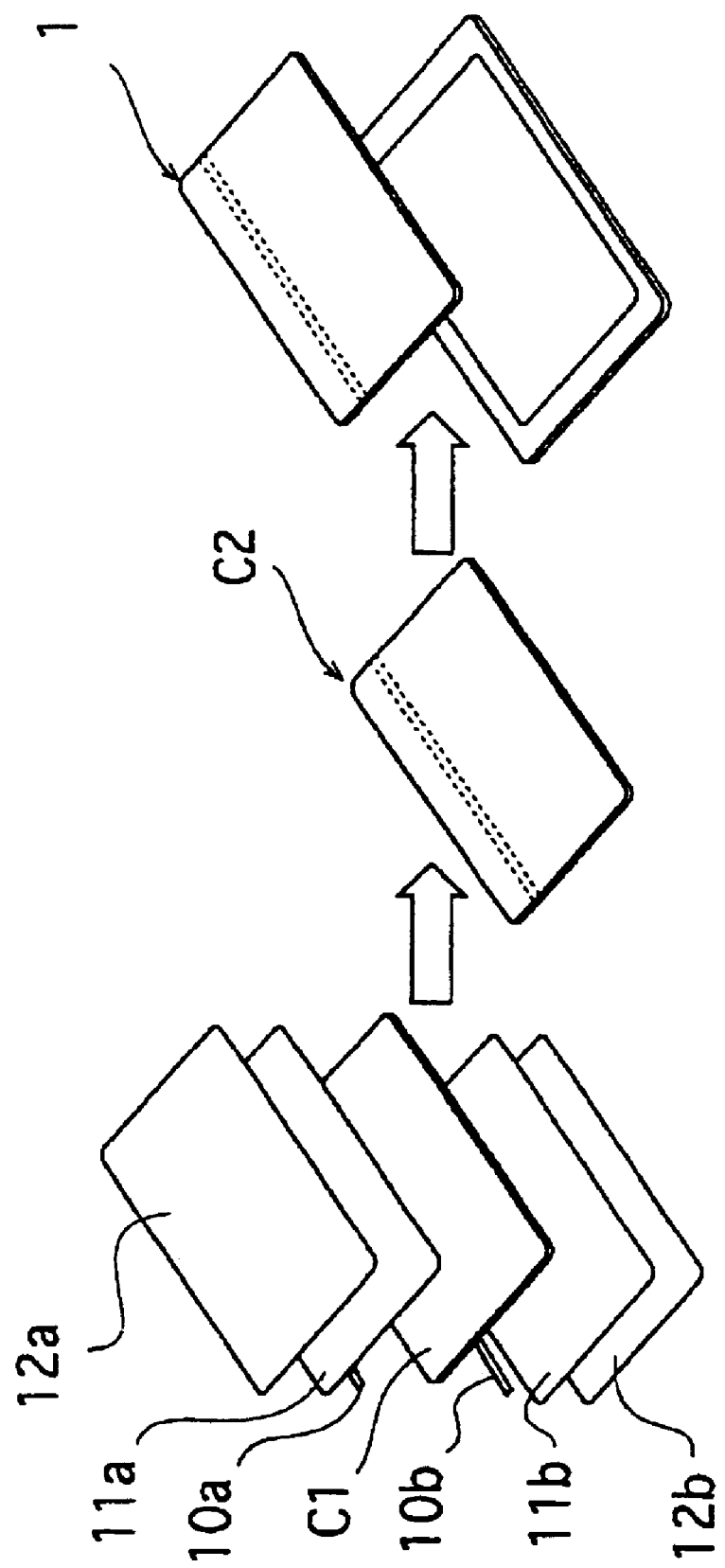
FIG. 20 is a perspective view illustrating the construction of a completed card body and a punching process to a standard size.
Figure 21A:
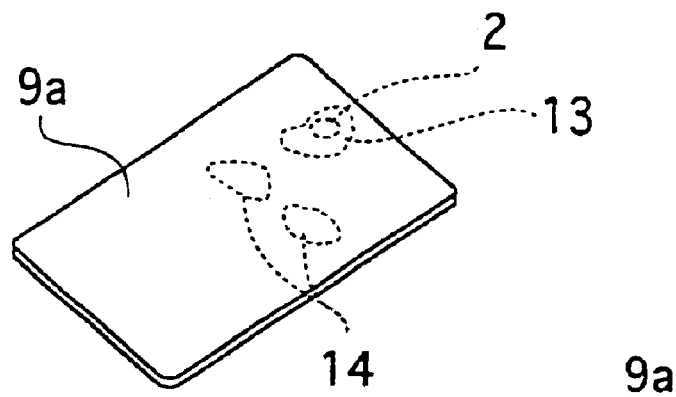
FIG. 21A is a perspective view illustrating void faults of an IC card.
Figure 21B:
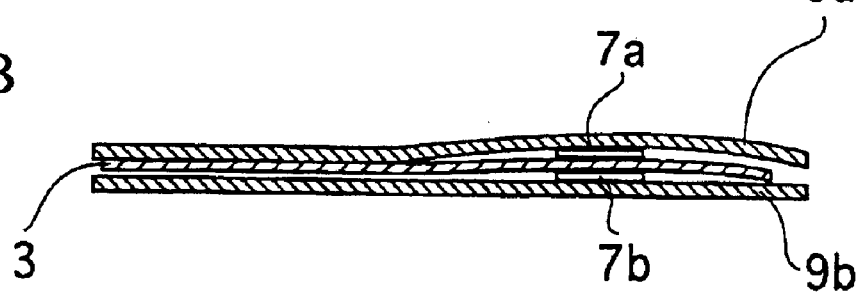
FIG. 21B is a sectional view of the IC card, which illustrates a void fault of the IC card and shows a state before thermo-compression bonding.
Figure 22A:
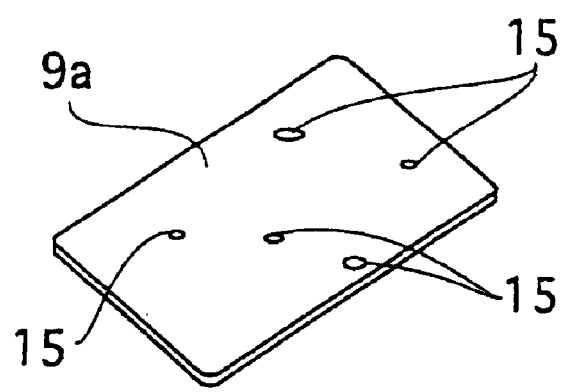
FIG. 22A is a perspective view of an IC card illustrating void faults of the IC card, and FIG. 22B a sectional view of the IC card, which illustrates the void faults of the IC card and shows a state after thermo-compression bonding.
Figure 22B:
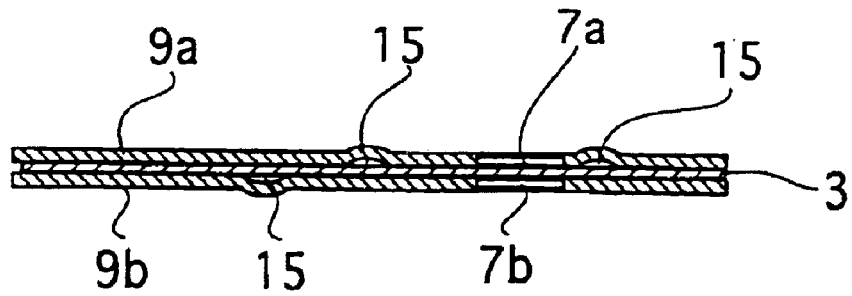
Figure 23:
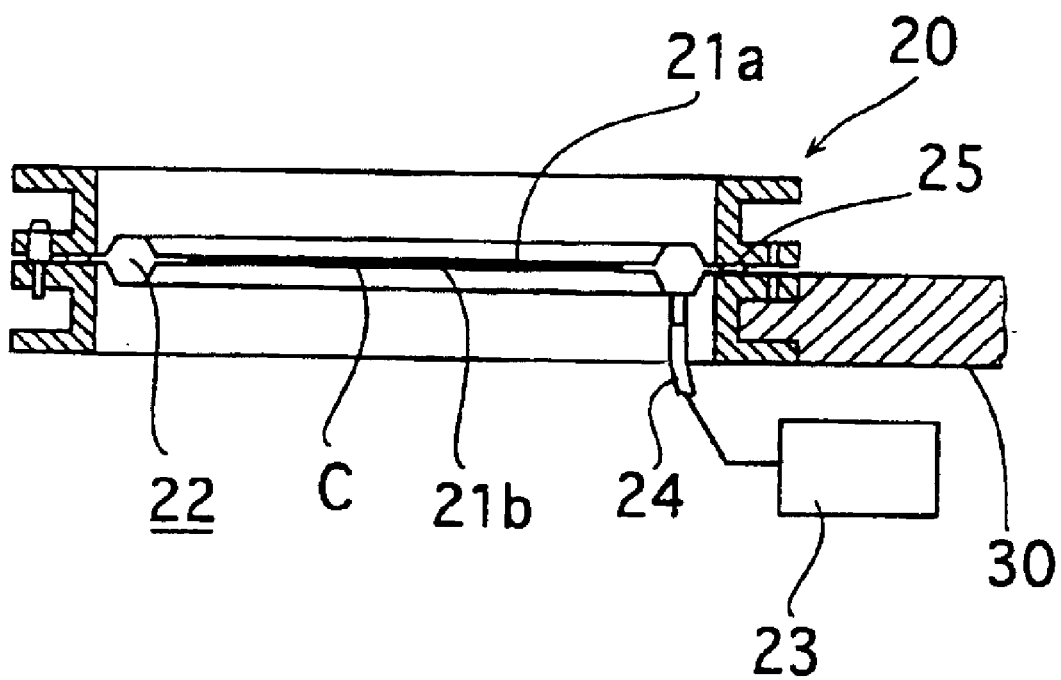
FIG. 23 is a sectional view showing the construction of a conventional plate for hot pressing.
Figure 24:
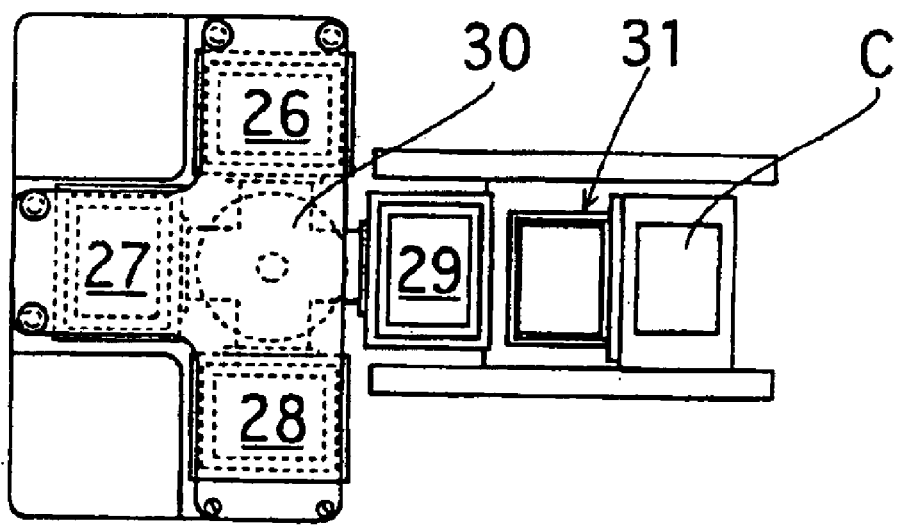
FIG. 24 is a plan view showing a conventional hot press apparatus or a card manufacturing apparatus.

FIG. 1 shows the whole of an IC card manufacturing apparatus 100 according to an embodiment of the present invention. The IC card manufacturing apparatus 100 is mainly composed of a base material supply section 102 supplying base constituting materials of an IC card (hereinafter also referred to as card constituting base materials C or base materials C in a lump) such as the antenna substrate 3 and the packaging materials 9a and 9b, which were described by reference to FIG. 19, to a plate for hot pressing 101, a primary lamination section 103 manufacturing a laminated body (solid white card) C1 of the card constituting base materials C, a secondary lamination section 104 forming a surface printed layer and the like on the laminated body C1 to manufacture a completed card body C2, a card takeout section 105 taking out a manufactured card to the outside, and a cleaning section 106 (FIG. 13) performing a prescribed cleaning operation of a plate for hot pressing 101.

A plate for hot pressing 101 is cyclically conveyed on a pair of conveyance rails 108A and 108B at an upper side and a lower side in an arrow direction in the figure. The IC card manufacturing apparatus 100 is constructed to sequentially carry the plate for hot pressing 101 from the base material supply section 102 to the primary lamination section 103, the secondary lamination section 104, the card takeout section 105 and the cleaning section 106 in order.

Figure 2:
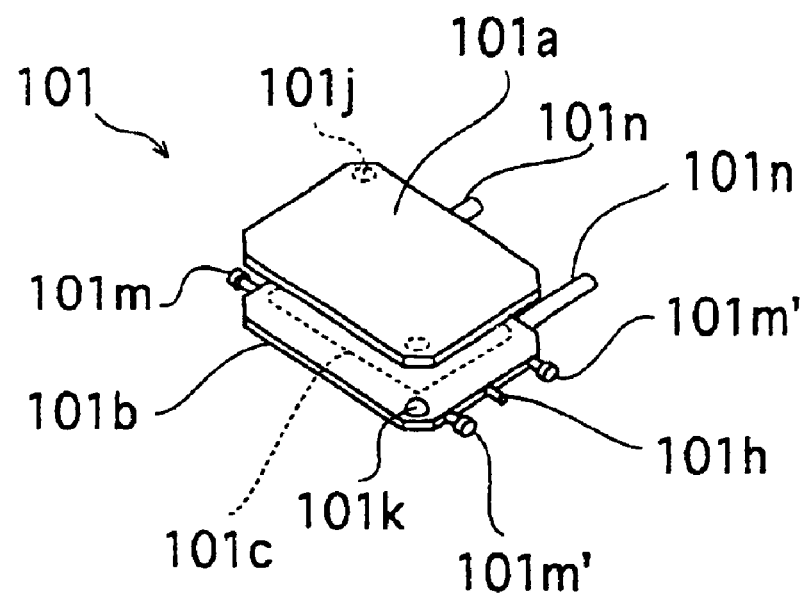
FIG. 2 is an exploded perspective view of a plate for hot pressing according to the embodiment of the present invention.
Figure 3:
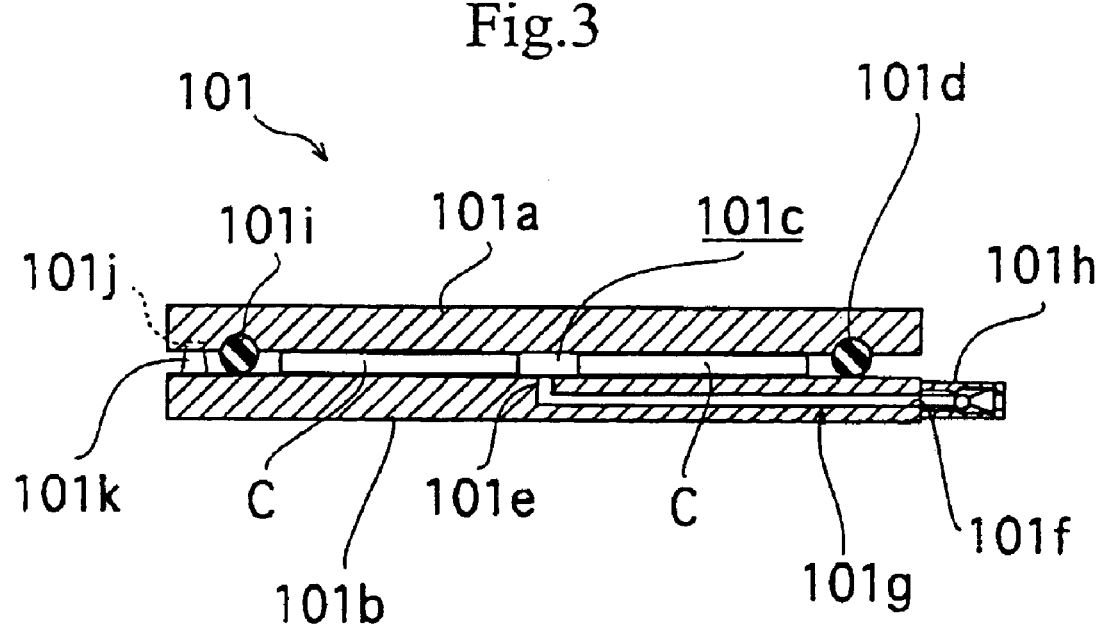
FIG. 3 is a sectional view of the plate for hot pressing according to the embodiment of the present invention.

Here, the details of the plate for hot pressing 101 of the present embodiment are described by reference to FIGS. 2 and 3.

The plate for hot pressing 101 is composed of a pair of plate members 101a and 101b on an upper side and a lower side, an annular sealing member 101d which is provided between the plate members 101a and 101b to form a base material accommodating section 101c, an exhaust passage 101g having one end 101e being opened to the base material accommodating section 101c and the other end 101f being opposed to a side wall surface of the lower plate member 101b, and a check valve device 101h which is provided at the other end 101f of the exhaust passage 101g to prohibit admission of the outside air into the base material accommodating section 101c.

The sealing member 101d is integrated with the upper plate member 101a by being accommodated in an annular groove 101i formed on the upper plate member 101a, and the exhaust passage 101g is formed inside the lower plate member 101b. Moreover, a pair of fitting holes 101j and 101j into which fitting projections 101k and 101k being formed to protrude from diagonals on the inner surface of the lower plate member 101b fit are formed on the diagonals on the inner surface of the upper plate member 101a.

The base material accommodating section 101c is formed to have a size at a degree capable of arranging two pairs of base materials C to be formed to be larger than the size of an IC card 1 a little in the present embodiment. The base materials C and C in the base material accommodating section 101c are arranged not to block the one end 101e of the exhaust passage 101g.

The check valve device 101h originally has a function of allowing an air flow form the side of the one end 101e of the exhaust passage 101g to the side of the other end 101f thereof and of prohibiting a reverse air flow. However, the check valve device 101h has also a function of allowing an air flow from the side of the other end 101f to the side of the one end 101e (release function) by releasing the seating state of its valve body, or by releasing its release valve, on the basis of a mechanical or electrical operation from the outside. In the present embodiment, a check valve device of a system in which its valve is opened by the mechanical pushing of its valve sheet to move. To put it concretely, Self Lock Coupler (product name) IN-334-79 manufactured by SMC Corporation is used.

Figure 8A:
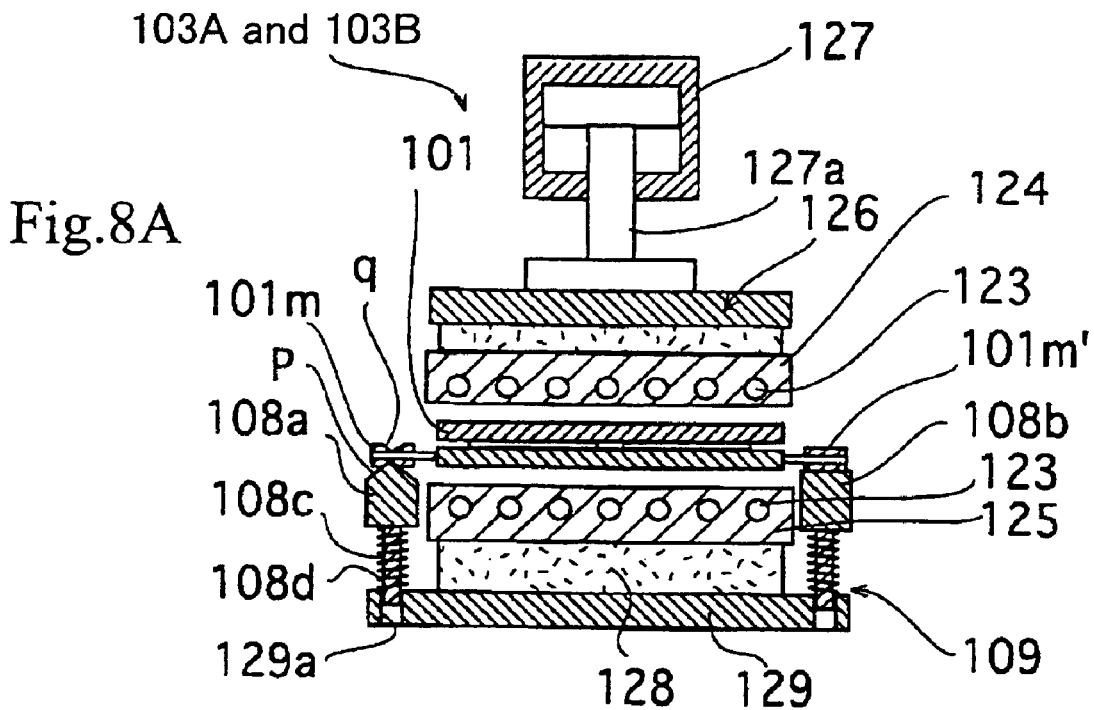
FIG. 8A and FIG. 8B are sectional views showing the constructions of a preheating press section and a hot press section according to the embodiment of the present invention, and among them

Pairs of guide rollers 101m and 101m' are severally formed on both side wall surfaces of the lower plate member 101b. The guide rollers 101m and 101m' are attached to the lower plate member 101b rotatably. The guide rollers 101m and 101m' are contacted in a rotatable state with double conveyance rails 108A and 108B on the upper side and the lower side for conveying the plate for hot pressing 101. The conveyance rails 108A and 108B are composed of a pair of guide rail sections 108a and 108b which are arranged in parallel to each other in the horizontal direction correspondingly to the guide rollers 101m and 101m'. For example, as shown in FIG. 8A, a rolling connection part p of the guide rail section 108a on one side is formed to have a cross section of a triangle, and a rolling connection part of the guide roller 101m corresponding to the rolling connection part p is formed to be a V-shaped groove q. Thereby, the engaging relationship of both of them is obtained.

On the other hand, the rolling connection part of the guide rail section 108b on the other side is formed to be flat, and the rolling connection part of the guide roller 101m' on the other side is also formed to be flat correspondingly.

Moreover, a pair of pushing rods 101n and 101n which is contacted with and pushes the end (rear end) on the reverse side of traveling direction of a plate for hot pressing 101 existing on the downstream side is provided on the end (front end) of the lower plate member 101b on the traveling direction side. The conveyance pitches of the plates for hot pressing 101 conveyed on the conveyance rails 108A and 108B are determined by the lengths of the axes (the amount of protrusion) of these pushing rods 101n and 101n (see FIG. 6).

Successively, the details of the construction of the IC card manufacturing apparatus 100 will be described in the order of processing steps in the following.

The base material supply section 102 is composed of a base stand 110 arranged on the side of one end (the left end side in FIG. 1) of the double conveyance rails 108A and 108B on the upper side and the lower side, an index table 111 which is driven to rotate dividedly by a prescribed angle (60° in the present embodiment) into the arrow direction in the figure to the top surface of the base stand 110, and sets of magazines 112a–112f, one set of which is composed of a pair of the magazines 112a–112f and all sets of which are arranged at a circumference on the top surface of the index table 111 by a pitch of the prescribed angle, for accommodating the card constituting base materials C therein.

The base materials C of the same kind are accommodated in the same set of magazines 112a–112f. In the present embodiment, as the base materials C, packaging materials 9b which are united with adhesive layers 8b to be one body severally are heaped up in the magazines 112a, 112a, 112d and 112d. Moreover, antenna substrates 3 on which IC chips 2 are mounted are heaped up in the magazines 112b, 112b, 112e and 112e. Packaging materials 9a which are united with adhesive layers 8a to be one body-severally are heaped up in the magazines 112c, 112c, 112f and 112f.

Figure 4A:
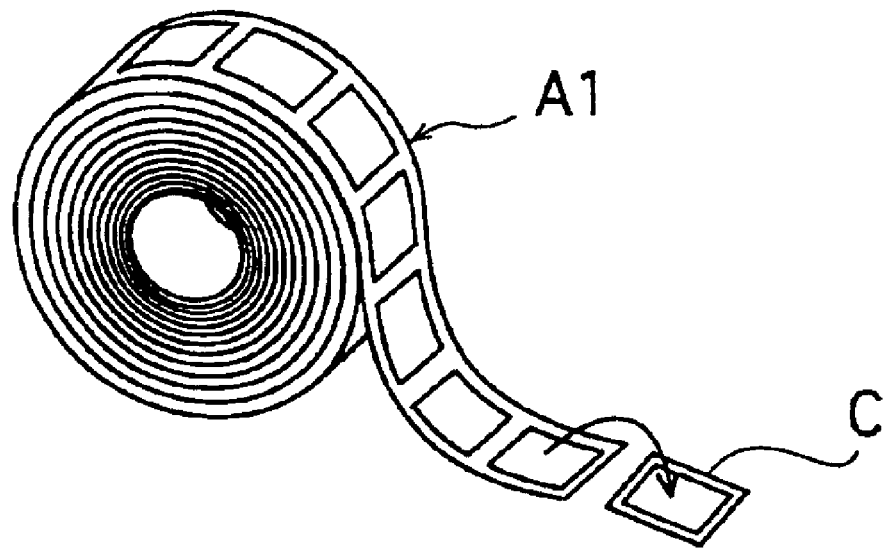
FIG. 4A is an explanatory view illustrating a cutting form of a base material to the size of a card.
Figure 4B:
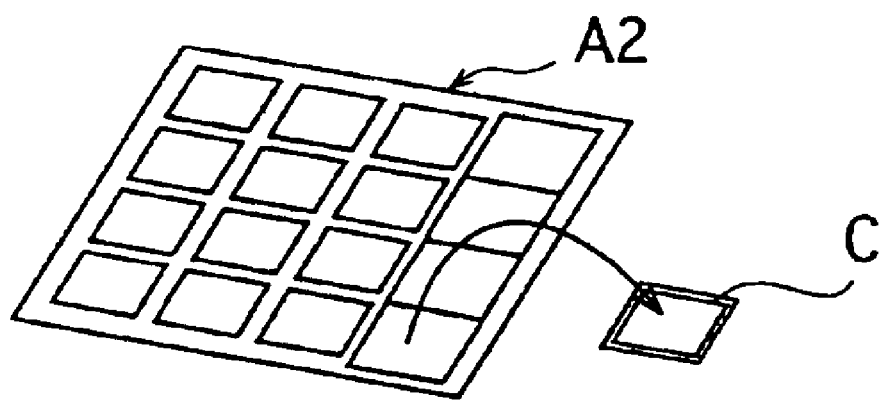
FIG. 4B is an explanatory view illustrating a punching form of the base material.

Incidentally, these base materials C are separated from a continuous body A1 of the base materials which is wound in a roll as shown in FIG. 4A, or are separated from a flat paper A2 including, for example, 16 sheets of cards as shown in FIG. 4B, by cutting or punching into an external form larger a little than the size of a card including a margin to extract one by one.

Figure 5:
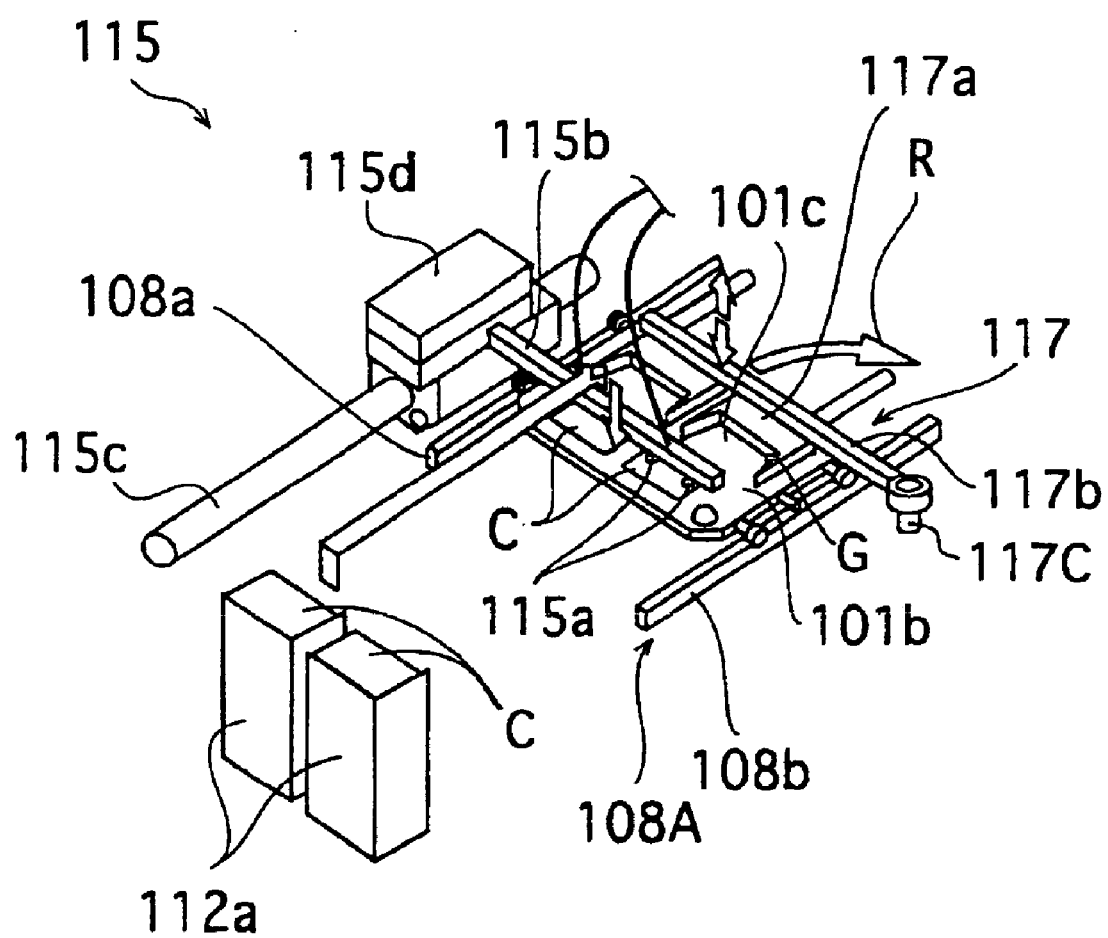
FIG. 5 is a perspective view showing details of the base material supply section according to the embodiment of the present invention.

As shown in FIG. 5, a base material transferring mechanism 115 capable of moving reciprocally between the index table 111 and the upper conveyance rail 108A is provided between them. The base material transferring mechanism 115 has a transfer arm 115b equipped with a plurality of suction pads 115a capable of performing vacuum suction and hold of the base materials C housed in the magazines 112a–112f, and an operation cylinder 115d which supports one end of the transfer arm 115b and reciprocally moves along a guide axis 115c lying in an elongated state in parallel with the conveyance rail 108A. The transfer arm 115b enters into a gap between the under surface of the upper plate member 101a and the top surface of the lower plate member 101b which are sucked and held by a plate holding member 116 (FIG. 1) from an upper position of a set of magazines 112(a–f), and the transfer arm 115b supplies two base materials C and C to the base material accommodating section 101c on the lower plate member 101b at the same time.

A positioning mechanism 117 for collating and positioning the base materials C and C transferred by the base material transferring mechanism 115 in the order of lamination is provided by the side of the upper conveyance rail 108A in a movable state to the top surface of the lower plate member 101b. The positioning mechanism 117 is composed of a pair of almost U-shaped positioning sections 117a and 117a having almost the same shape as the external form of the base materials C, a supporting arm 117b supporting the positioning sections 117a and 117a, and a rotating axis 117c which is moved up and down in the arrow direction in the figure and is connected with a not shown drive motor to rotate the supporting arm 117b in an R direction. Thereby, the base materials C and C transferred by the transfer arm 115b are supplied to the top surface of the lower plate member 101b in the state in which the circumferences of the base materials C and C are subjected to the guiding operations of the positioning sections 117a and 117a having guiding surfaces G formed in a tapered state to be corrected to a prescribed posture.

At the end on the one end side of the upper conveyance rail 108A, a conveyance pusher 118A for pushing out the plate for hot pressing 101 composed of the upper and the lower plate members 101a and 101b which are superposed upon each other into the arrow direction in the figure is provided. The conveyance pusher 118A is constructed to be reciprocally movable in the direction parallel to the conveyance rail 108A, and the conveyance pusher 118A moves the plate for hot pressing 101 by a pitch in the conveyance direction.

Figure 6:
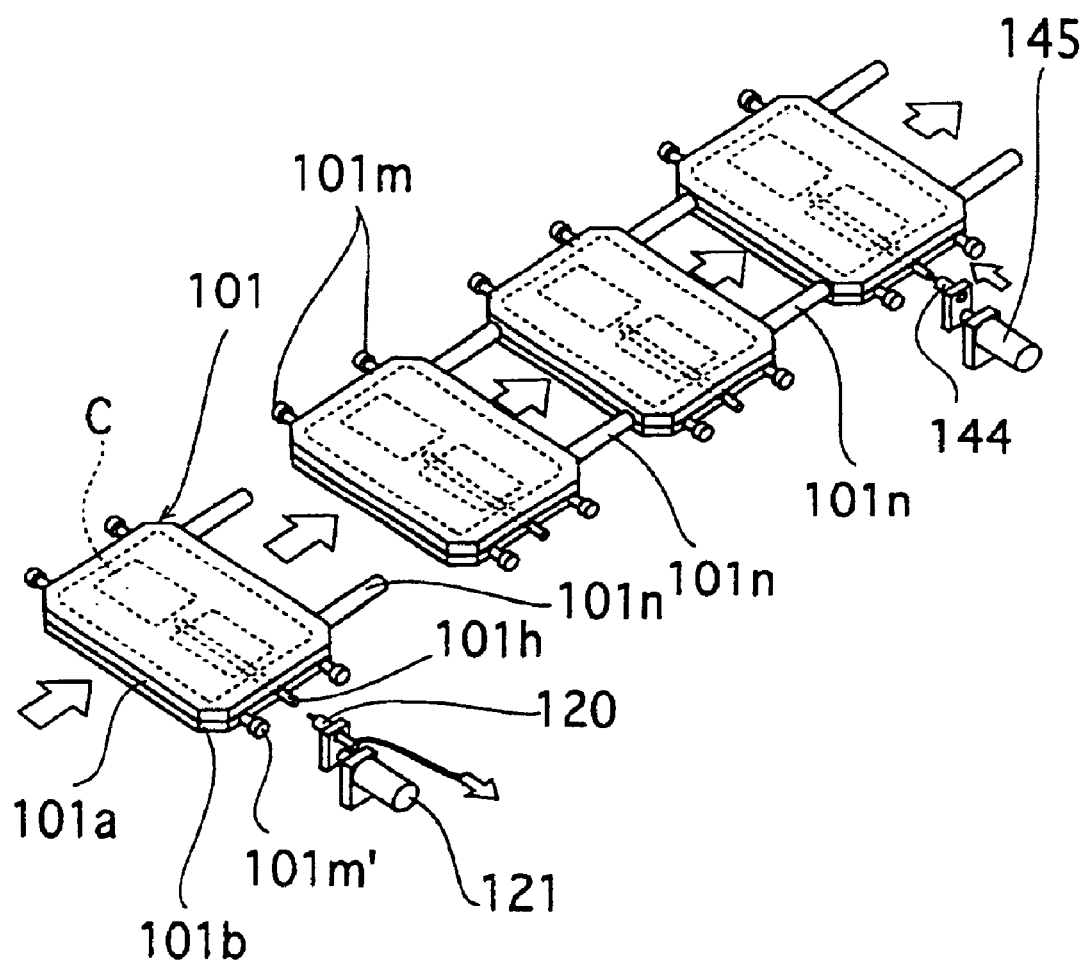
FIG. 6 is a perspective view illustrating a conveyance form of plates for hot pressing according to the embodiment of the present invention.

At a position just before the primary lamination section 103, as shown in FIG. 6, a nozzle operation cylinder 121 for connecting a suction nozzle 120 communicating with a deaeration apparatus such as a not shown vacuum pump is provided to the check valve device 101h of the plate for hot pressing 101. The nozzle operation cylinder 121 is constructed to be linearly movable to the plate for hot pressing 101 arrived at the position. By connecting the suction nozzle 120 with the check valve device 101h, the nozzle operation cylinder 121 performs the vacuum pumping of the inside of the base material accommodating section 101c to a prescribed pressure. In the present embodiment, a vacuum pressure at a degree capable of absorbing and holding the lower plate member 101b with the upper plate member 101a is set as the prescribed pressure. The suction nozzle 120, the nozzle operation cylinder 121, the vacuum pump and the like constitute vacuum pumping means according to the present invention.

Next, the primary lamination section 103 is constructed by arranging a preheating press section 103A, a hot press section 103B and a cooling press section 103C in series in the order of processing.

Figure 7:
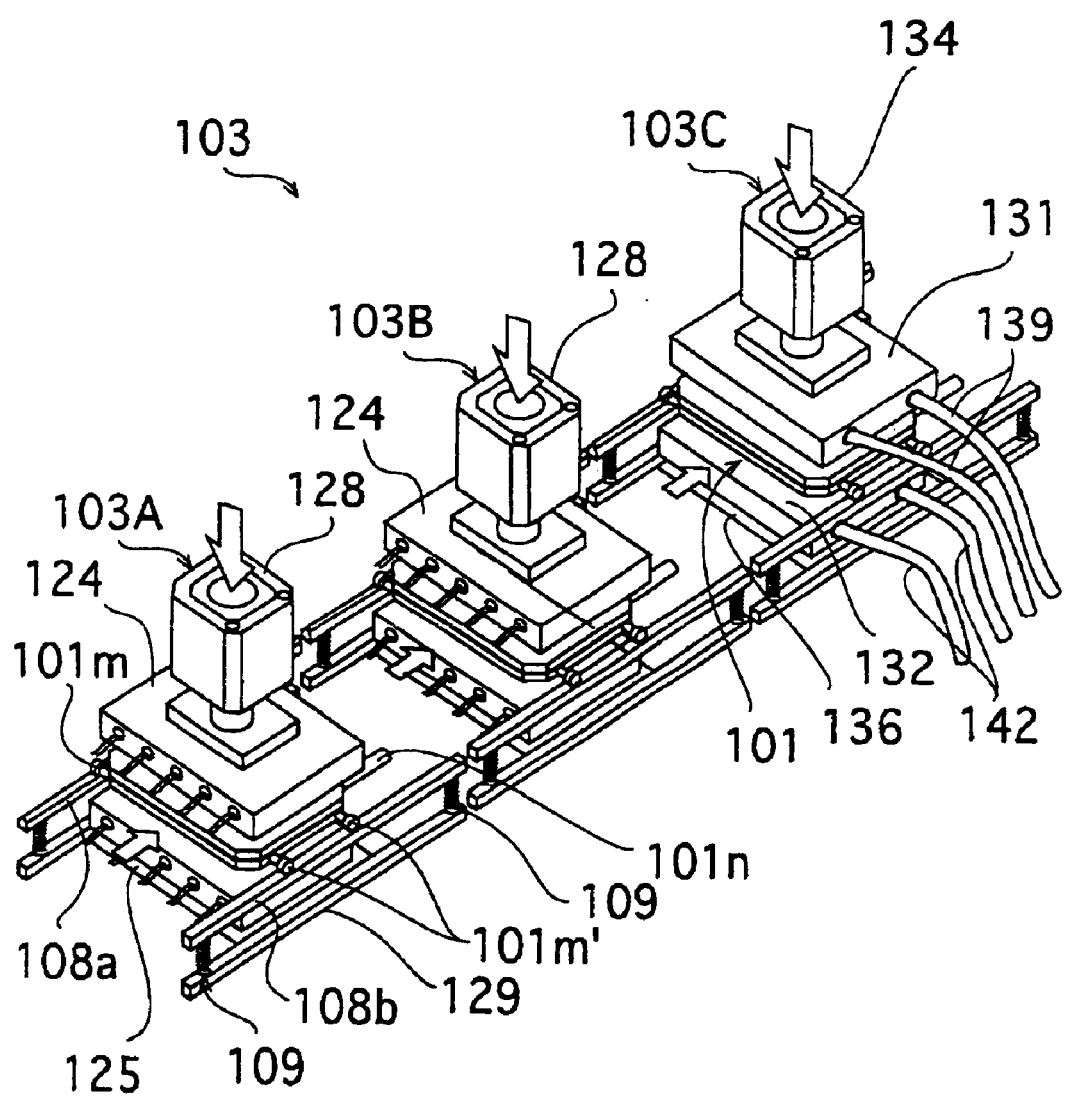
FIG. 7 is a perspective view showing the construction of a primary lamination section according to the embodiment of the present invention.

As shown in FIG. 7 and FIG. 8A, the preheating press section 103A and the hot press section 103B include a movable hot pressing machine 124 and a fixed hot pressing machine 125, both having heaters 123 and 123 built therein. The movable hot pressing machine 124, one of the machines 124 and 125, is coupled with a drive rod 127a of an operation cylinder 127 with an adiabatic joint 126 put between them, and is thereby made to be movable vertically by the driving of the operation cylinder 127. The fixed hot pressing machine 125, the other one of the two, is fixed to a base 129 supported by a rest system such as a pedestal (not shown) supporting the conveyance rails 108A and 108B with an adiabatic member 128 put between the hot pressing machine 125 and the base 129.

The plate for hot pressing 101 is made to be movable along the conveyance rail 108A between the movable hot pressing machines 124 and the fixed hot pressing machines 125. Clearances between the plate for hot pressing 101 and the respective hot pressing machines 124 and 125 are set to be within a range of 2 mm or more and 20 mm or less.

In particular, each of the guide rail sections 108a and 108b forming the conveyance rail 108A in the primary lamination section 103 are formed to be separated at every press sections 103A–103C with a gap of a little less than 1 mm. On the under surfaces of the guide rail sections 108a and 108b, elastic supporting mechanisms 109 constructed by inserting guide shafts 108c and 108c into insertion holes 129a of the base 129 slidably with springs 108d and 108d wound around the guide shafts 108c and 108c.

Thereby, the guide rail sections 108a and 108b are elastically supported by the elastic supporting mechanisms 109 (FIG. 8A). When the plate for hot pressing 101 is nipped between respective hot pressing machines 124 and 125 by an descent operation of the movable hot pressing machine 124, the guide rail sections 108a and 108b sink to the side of the base 129 (FIG. 8B) by being subjected to a pressurizing force caused by the operation cylinder 127. As described above, the conveyance rail 108A adopts an independent suspension system at each of the press sections 103A–103C.

Figure 10:
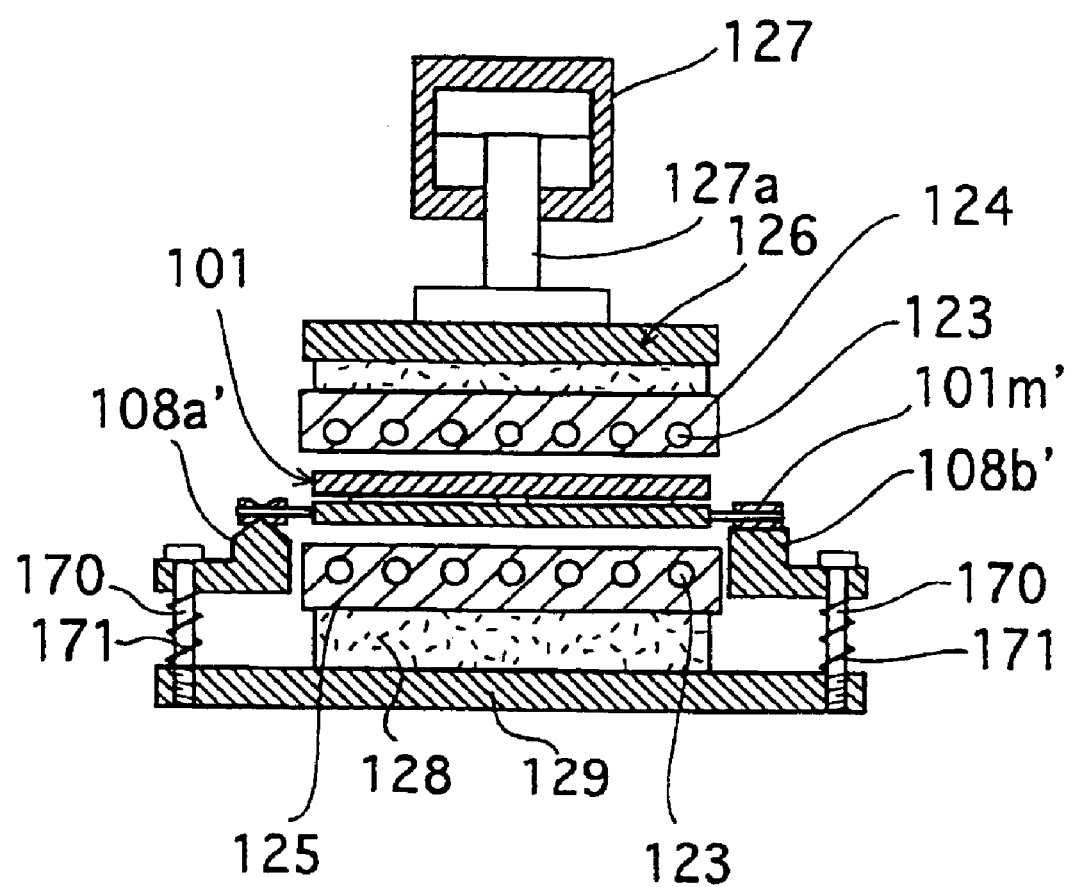
FIG. 10 is a sectional view showing an example of a variation of a principle part according to the embodiment of the present invention.

Incidentally, instead of the above-mentioned construction, the elastic supporting mechanisms 109 can adopt the following construction. That is, guide rail sections 108a' and 108b' are formed as ones shown in FIG. 10, and the guide rails sections 108a' and 108b' are supported by bolt members 170 to the base 129. Furthermore, the under surfaces of the guide rail sections 108a' and 108b' are elastically supported by springs 171 and 171.

In the present embodiment, the preheating press condition in the preheating press section 103A is set to be 100° C.~180° C.×200 kg×10~70 seconds per card, and the heating press condition in the hot press section 103B is set to be 100° C.~200° C.×1000 kg×10~70 seconds per card. Incidentally, the temperatures of the movable hot pressing machines 124 and the fixed hot pressing machines 125 are managed by a plurality of thermoelectric couples, though it is not shown. And the temperatures are kept at each of the temperatures by temperature control means such as an electronic temperature control device.

Figure 9:
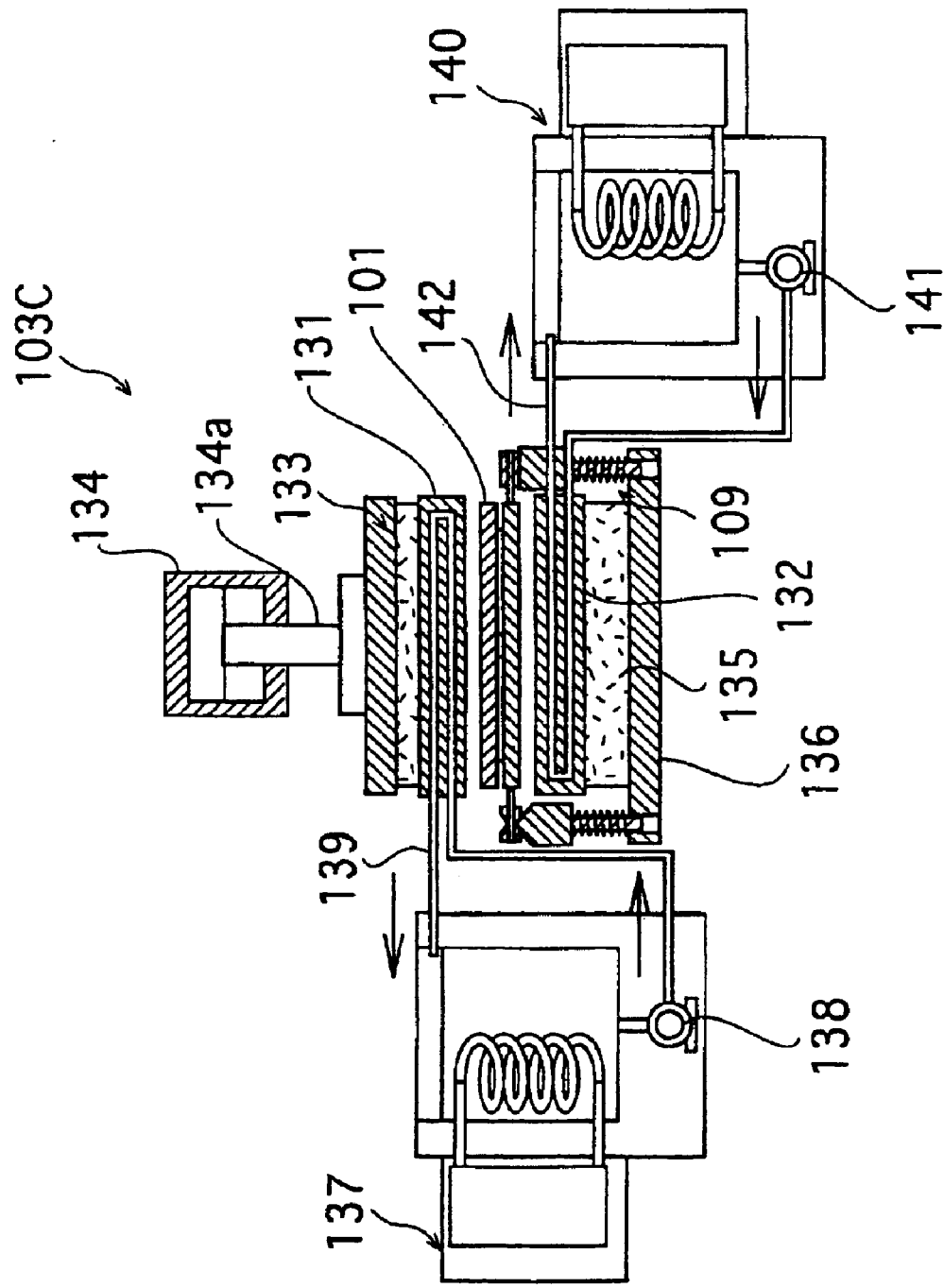
FIG. 9 is a sectional view showing the construction of a cooling press section according to the embodiment of the present invention.

Next, the cooling press section 103C is constructed as shown in FIG. 9. The cooling press section 103C includes a movable cooling press machine 131 and a fixed cooling press machine 132. The movable cooling press machine 131, one of the press machines 131 and 132, is connected with a drive rod 134a of an operation cylinder 134 with an adiabatic joint 133 put between them. Thereby, the movable cooling press machine 131 is made to be vertically movable by the drive of the operation cylinder 134. A water passing pipe 139 of cooling water (15° C.~20° C.) which is cooled by a cooling unit 137 and is circulated by a pump 138 is provided inside the movable cooling press machine 131. The fixed cooling press machine 132, the other one of the two, is fixed on a base 136 supported by the rest system such as the pedestal (not shown) supporting the conveyance rails 108A and 108B with a heat insulation member 135 put between the fixed cooling press machine 132 and the base 136. Inside the fixed cooling press machine 132, a water passing pipe 142 of cooling water (15° C.~20° C.) which is cooled by a cooling unit 140 and is circulate by a pump 141 is provided.

Incidentally, the separated guide rail sections 108a and 108b in the cooling press section 103c also adopt the independent suspension system by means of the elastic supporting mechanisms 109. Moreover, in the construction example shown in FIG. 9, the construction example in which the independent cooling units 137 and 140 are provided to each of the movable cooling press machine 131 and the fixed cooling press machine 132 is shown. The present invention is not limited to such a construction. Needless to say, it is also possible to adopt the construction in which cooling water is supplied to each of the pressing machines 231 and 132 by the use of one cooling unit 137 as shown in FIG. 1.

At a just after step of the cooling press section 103C, an operation cylinder 145 equipped with a releasing device 144 for releasing the check function of the check valve device 101h of the plate for hot pressing 101 by the above-mentioned method is provided as shown in FIG. 6. When the plate for hot pressing 101 arrives at the located place of the operation cylinder 145, the operation cylinder 145 performs an operation of connecting the releasing device 144 with the check valve device 101h to release the base material accommodating section 101c to the air. The releasing device 144 and the operation cylinder 145 constitute vacuum releasing means according to the present invention.

A plate holding member for holding the upper plate member 101a of the plate for hot pressing 101 and opening the top surface of the lower plate member 101b is provided at a part where the operation cylinder 145 is located, though the plate holding member is not shown. Thereby, it becomes possible to take out the laminated bodies C1 of the base materials C made at the primary lamination section 103 to the outside. In the present embodiment, a completed card body C2 can be obtained as follows. That is, magnetic stripe layers 10a and 10b for recording and reproducing information, magnetic stripe masking layers 11a and 11b, and outermost layer resin sheets (printing ink layers) 12a and 12b on which a design pattern is printed (see FIG. 19 as to the above) are collated and laminated on both the surfaces of the laminated body C1 in order. After that, the collated and laminated-layers and sheets are subjected to prescribed press processing at the secondary lamination section 104 in the latter step for obtaining the completed card body C2.

The secondary lamination section 104 is composed of a hot press section 104A and a cooling press section 104B, both being arranged in series in the order of processes. Because the hot press section 104A and the cooling press section 104B respectively have the same constructions as those of the hot press section 103B and the cooling press section 103C in the primary lamination section 103, the descriptions of the constructions are omitted here.

Figure 11A:
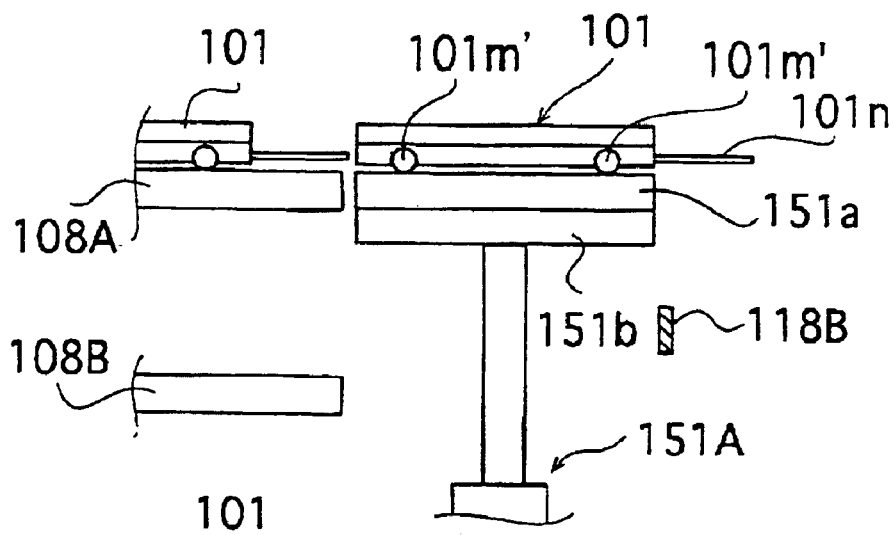
FIGS. 11A to 11C are side views showing the construction of a hoisting mechanism according to the embodiment of the present invention typically, and among them
Figure 11B:
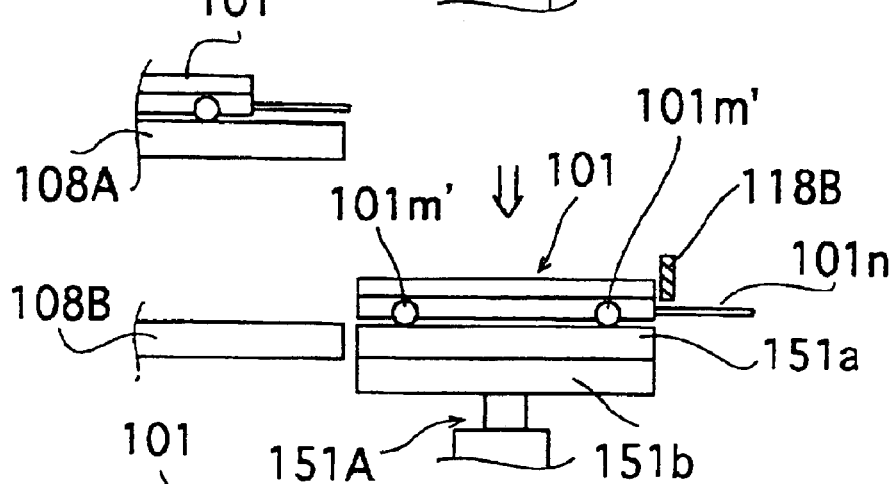
Figure 11C:
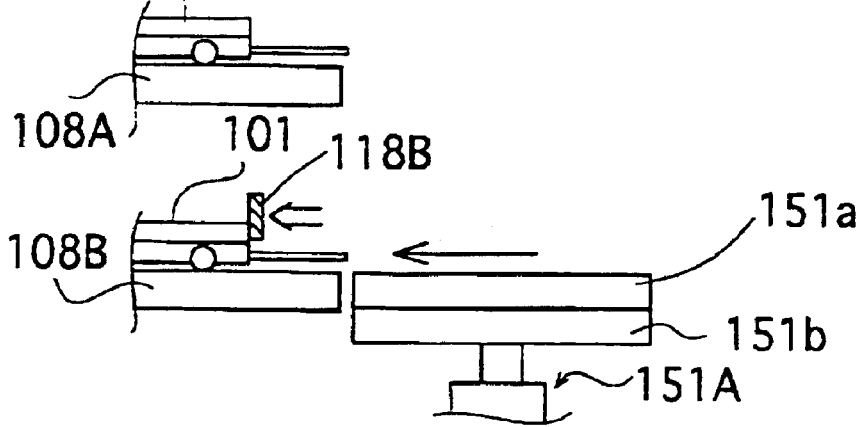

A hoisting mechanism 151A having the construction shown in FIGS. 11A–11C typically is provided between the end on the other end side of the upper conveyance rail 108A (right end in FIG. 1) and the end on the other end side of the lower conveyance rail 108B. The hoisting mechanism 151A is composed of a hoisting pedestal 151b equipped with a rail section 151a, to which the guide rollers 101m and 101m' of the plate for hot pressing 101 are rotatably contacted, on both side edge parts, and a drive cylinder 151d, the drive rod 151c of which is fixed on the bottom surface of the hoisting pedestal 151b. The hoisting mechanism 151A has a function of transferring the plate for hot pressing 101 between the upper conveyance rail 108A and the lower conveyance rail 108B (FIGS. 11A–11B).

The upper limit position of the hoisting pedestal 151b is set at the position where the rail section 151a aligns with the upper conveyance rail 108A. The lower limit position of the hoisting pedestal 151b is set at the position where the rail section 151a aligns with the lower conveyance rail 108B. In such a construction, the plate for hot pressing 101 descended at the same height position as that of the lower conveyance rail 108B by the hoisting mechanism 151A receives a pushing force of a conveyance pusher 118B arranged at almost the same height as that of the upper plate member 101a to be set out to the lower conveyance rail 108B (FIG. 1C). Incidentally, the conveyance pusher 118B is composed of a laminar member constructed to be reciprocally movable on the lower conveyance rail 108B by an operation cylinder 118S as shown in FIG. 1.

Now, the card takeout section 105 taking out completed card bodies C2 from the plate for hot pressing 101 and the cleaning section 106 (FIG. 13) for cleaning the top surface of the lower plate member 101b are provided to the lower conveyance rail 108B.

The card takeout section 105 includes a plate holding member (the diagrammatic representation of which is omitted) sucking and holding the upper plate member 101a to open the top surface of the lower plate member 101b, a receiving stand 152 located by the lower conveyance rail 108B, and a card transferring mechanism (the diagrammatic representation of which is omitted) moving between the opened lower plate member 101b and the receiving stand 152 reciprocally.

The receiving stand 152 is constructed as an index table driven to rotate in the state of being divided by 180 degrees to a supporting section 153. Two sets of card receiving magazines 154 and 154, one set of which is composed of a pair of the magazines 154, are provided on the top surface of the receiving stand 152 in the manner of being turned to each other. Each of the card receiving magazines 154 and 154 can house the prescribed number of the completed card bodies C2 severally, and is constructed as follows. That is, when the card receiving magazines 154 of one set are filled to the brim, the receiving stand 152 rotates by 180 degrees in order that completed card bodies C2 may be housed into the card receiving magazines 154 of the other set.

Figure 12:
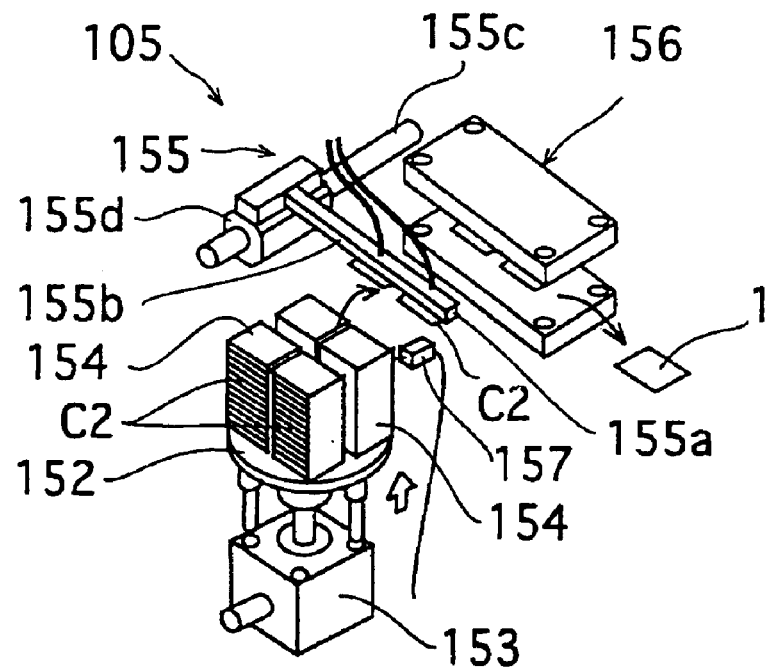
FIG. 12 is a perspective view showing the construction of a principle part of a card takeout section according to the embodiment of the present invention.

The supporting section 153 has a built-in lift mechanism driving the receiving stand 152 to move up and down by a prescribed pitch to perform the reception of the completed card bodies C2 from the card transferring mechanism at a prescribed height position always. Moreover, as shown in FIG. 12, in the vicinity of the receiving stand 152, a card punching apparatus 156 for stamping out the completed card bodies C2 into a standard size of 85.47~85.72 mm in its long side and 53.92~54.03 mm in its short side is located. The card punching apparatus 156 is arranged in order that the completed card bodies C2 may be conveyed from the card receiving magazine 154 to the card punching apparatus 156 trough a conveyance mechanism 155.

Incidentally, the conveyance mechanism 155 adopts a construction to move a conveyance arm 155b equipped with a suction pad 155a absorbing and holding a completed card body C2 reciprocally along a guide axis 155c with an operation cylinder 155d. Moreover, the adjustment of the height of the receiving stand 152 can automatically be performed with a provided optical upper limit recognition sensor 157 or a provided counter of the number of taken-out sheets.

The arrangement position of the card takeout section 105 is not limited to the above-mentioned location, and can appropriately be altered to positions such as the rightmost end of the upper conveyance rail 108A and the rightmost end of the lower conveyance rail 108B as the need arises.

Figure 13:
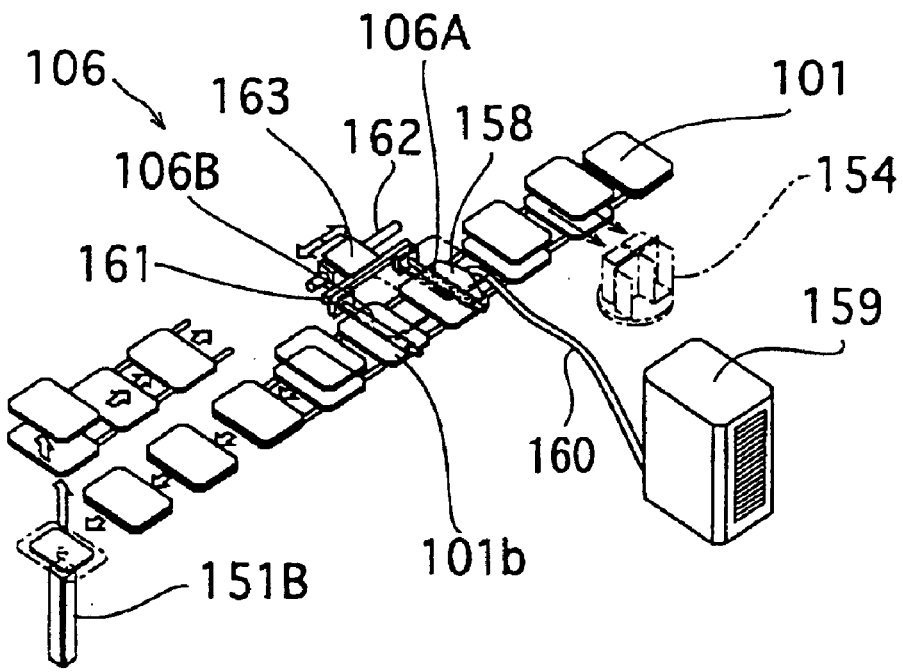
FIG. 13 is a perspective view showing the construction of a cleaning section according to the embodiment of the present invention.
Figure 14:
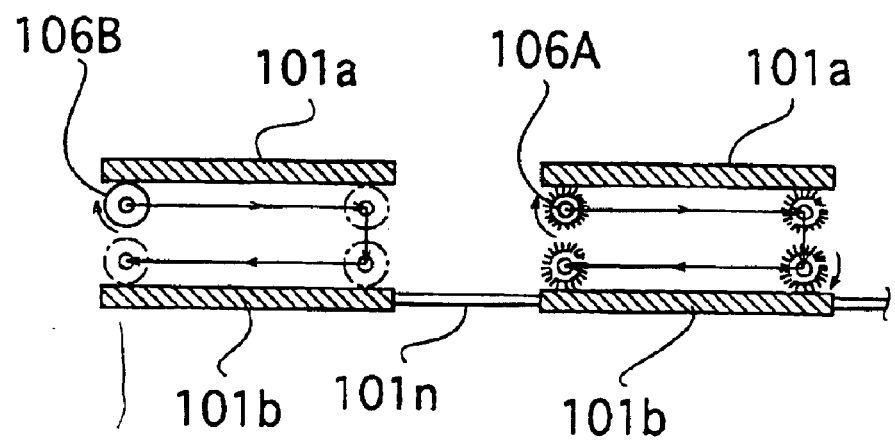
FIG. 14 is a type view illustrating operations of a rotation brush and a gum roller, both constituting the cleaning section according to the embodiment of the present invention.

On the other hand, the cleaning section 106 is a section for performing the cleaning processing of the plate members 101a and 101b on the upper side and the lower side, in which the completed card bodies C2 have been taken out at the card takeout section 105. In the present embodiment, as shown in FIGS. 13 and 14, the cleaning section 106 is composed of a rotary brush 106A with a hood 158 for wiping out the dust attached to the nipped surfaces of each of the plate members 101a and 101b, and a gum roller 106B for removing the dust attached to the nipped surfaces of each of the plate members 101a and 101b.

The rotary brush 106A includes a plurality of resin brush bristles planted on the peripheral surface of the rotary brush 106A. The rotary brush 106A is connected with a dust collector 159 being dust collection means through a communication pipe 160. The rotary brush 106A and the gum roller 106B are fixed on a fitting board 161 with an interval of a distance corresponding to one pitch of the lower plate members 101b conveyed on the lower conveyance rail 108B. The fitting board 161 is constructed to be integrally fixed with a cylinder 163 moving reciprocally along a guide axis 162 and to be reciprocally movable by a prescribed distance into the vertical direction in the state of being crossed with the guide axis 162 orthogonally. Thereby, as shown in FIG. 14, the rotary brush 106A and the gum roller 106B can synchronously move along each of the nipped surfaces of the upper plate members 101a and 101a and the lower plate members 101b and 101b which are adjacently conveyed.

Figure 15:
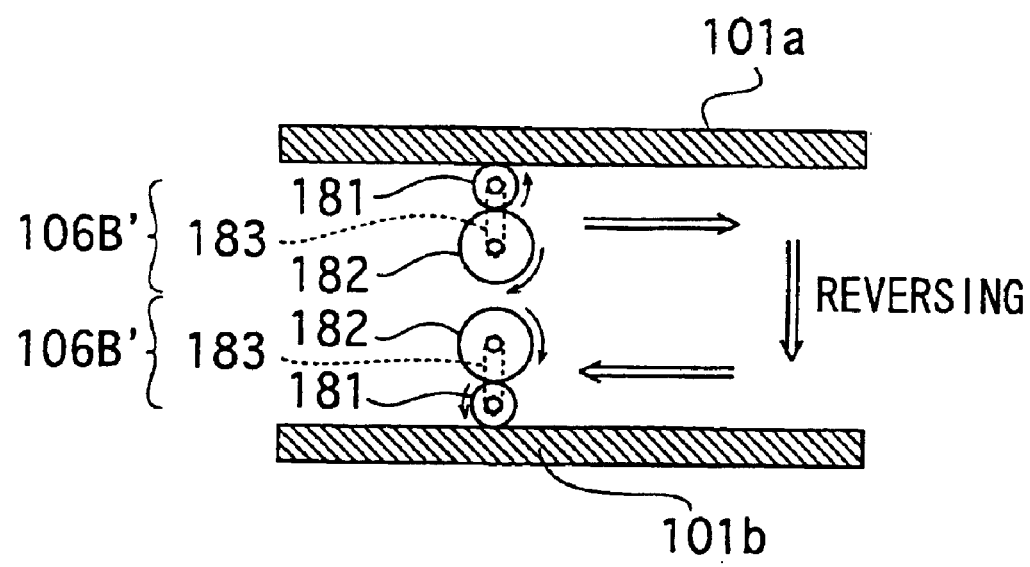
FIG. 15 is a type view illustrating an example of a variation of the gum roller constituting the cleaning section according to the embodiment of the present invention.

Incidentally, as shown in FIG. 15, it is also possible to construct a gum roller 106B' with a gum roller section 181 which has a small diameter and is contacted with each of the nipped surfaces of the plate members 101a and 101b, a gum roller section 182 which has a large diameter and is rotatably contacted with the gum roller section 181, and a coupling section 183 supporting the shaft center parts of the gum roller sections. In the construction example, the gum roller section 182 having the large diameter has larger adhesion in comparison with that of the gum roller section 181 having the small diameter. Then, the dust removed from the plate members 101a and 101b with the gum roller section 181 having the small diameter is removed form the gum roller section 181 with the gum roller section 182 having the large diameter. Thereby, the adhesive face of the gum roller section 181 is kept to be clean.

Next, a hoisting mechanism 151B having a similar construction to that of the hoisting mechanism 151A, which has been described by reference to FIGS. 11A–11C, is provided between the end on the one end side (left end in FIG. 1) of the upper conveyance rail 108A and the end on the one end side of the lower conveyance rail 108B. The hoisting mechanism 151B is constructed in order that the plate for hot pressing 101 located at the end on the one end side of the lower conveyance rail 108B may be conveyed to the end on the one end side of the upper conveyance rail 108A by the hoisting mechanism 151B.

As above, the conveyance means according to the present invention is composed of the conveyance pushers 118A and 118B and the hoisting mechanisms 151A and 151B. Incidentally, in FIG. 1, reference numerals 165 and 166 designate stoppers for preventing that the plate for hot pressing 101 jumps out from the ends of the conveyance rails 108A and 108B by the pushing operations of the conveyance pushers 118A and 118B. A reference numeral 167 designates a display section for controlling and monitoring the operational condition of each of the press sections of the primary lamination section 103 and the secondary lamination section 104.

Figure 16:
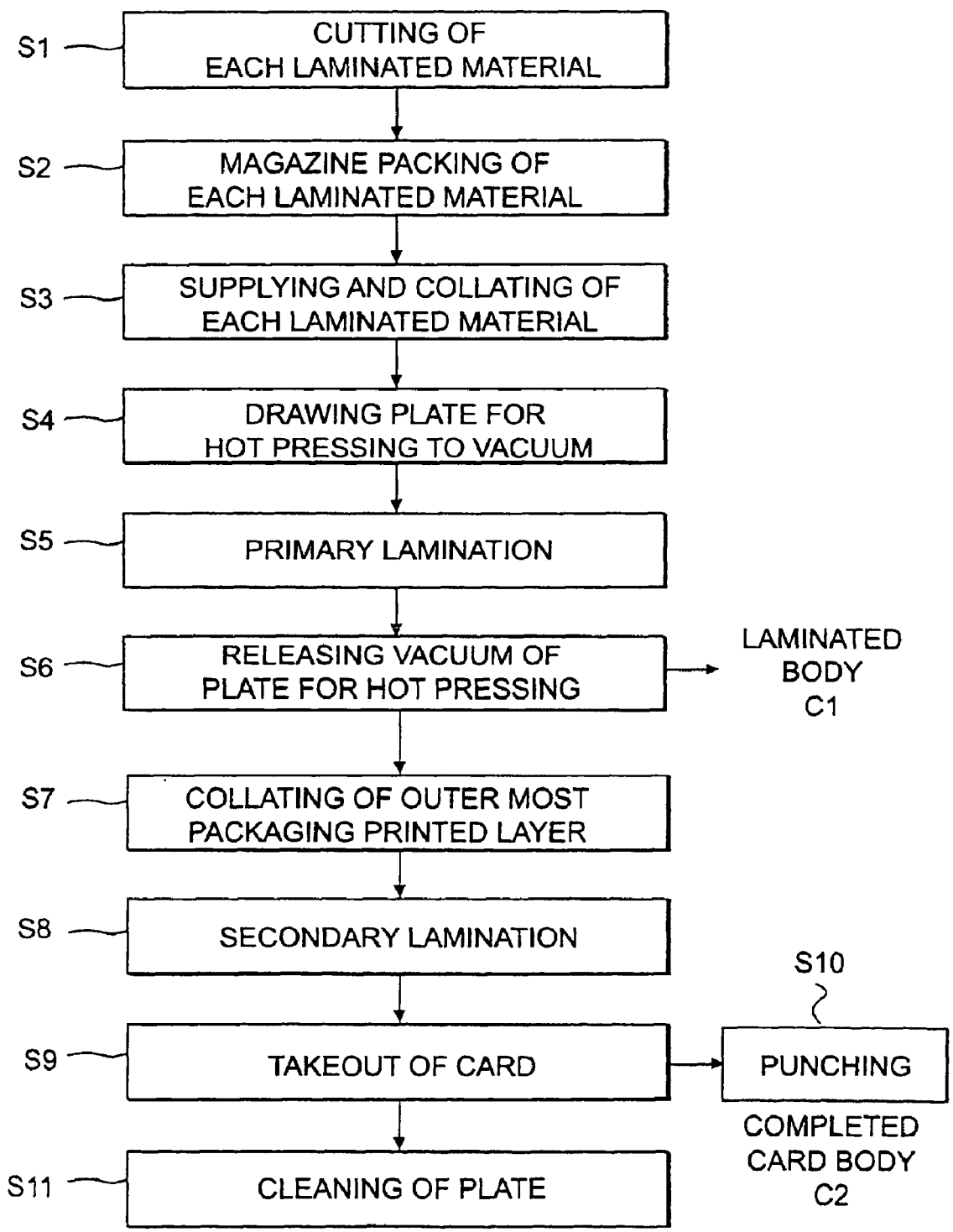
FIG. 16 is a process flow chart illustrating the operation of the card manufacturing apparatus according to the embodiment of the present invention.

Next, the operation of the card manufacturing apparatus 100 of the present embodiment constructed as above is described. FIG. 16 shows a process flow of the present embodiment.

Each of the base materials C (3, 9a, 9b) cut or stamped out into the size of a card in the base material supply section 102 is housed in the magazines 112a–112f set at the prescribed positions on the index table 111 in the order of lamination (Steps S1 and S2). Then, the under packaging materials 9b and 9b are transferred from the magazines 112a and 112a to the top surface of the opened lower plate member 101b of the plate for hot pressing 101 located at the end on the one end side of the upper conveyance rail 108A by the base material transferring mechanism 115 (FIG. 5). At this time, the under packaging materials 9b and 9b are supplied in a prescribed posture by the positioning section 117a of the positioning mechanism 117 waiting on the top surface of the lower plate member 101b. By repeating the similar operations successively, the antenna substrates 3 and 3 and the upper packaging materials 9a and 9a are collated and laminated from the magazines 112b and 112c on the under packaging materials 9b and 9b (Step S3).

By adopting the base material supply section 102 equipped with the index table 111, on which the magazines 112a–112f are located, the base material transferring mechanism 115 and the positioning mechanism 117, the present embodiment achieves the decrease of a location space, while the collating and the lamination of the base materials can automatically be performed. Moreover, because the base materials C have the size of a card, a high collation precision can easily be obtained.

After the lamination of the antenna substrates 3 and the packaging materials 9a and 9b have been completed, the supporting arm 117b of the positioning mechanism 117 rotates to move in the R direction by using the rotating axis 117c as a fulcrum. Then, the upper plate member 101a covers the lower plate member 101b, and the base material accommodating section 101c is formed with the sealing member 101d (FIG. 3). And, the plate for hot pressing 101 advances by a pitch along the upper conveyance rail 108A by the operation of the conveyance pusher 118A.

At this time, because the engaging relationship p, q is formed between the set of the guide rail section 108a and the guide roller 101m on the one side, the movement of the plate for hot pressing 101 in the lateral direction is regulated by the guide rail section 108a. Moreover, because the engaging relationship is formed only on the one side, the plate for hot pressing 101 can appropriately be conveyed in conformity with the guide rail section 108a as a reference even if a discrepancy is produced in a pitch of the guide rail sections 108a and 108b.

Incidentally, when the conveyance pusher 118A is driven, all of the plates for hot pressing 101 on the upper conveyance rail 108A advance by receiving the pushing forces from the plates 101 located on the upper stream side. Moreover, because the conveyance pitches of the plates for hot pressing 101 are determined by the lengths of the pushing rods 101n, the conveyance pitches can easily be adjusted without altering the external forms of the plates.

Well, when the plate for hot pressing 101 has been conveyed to the position where the suction nozzle 120 is located, the nozzle operation cylinder 121 advances to connect the suction nozzle 120 with the check valve device 101h. Then, the vacuum pumping (deaeration) of the inside of the base material accommodating section 101c is performed to a prescribed pressure (Step S4). Because the sizes of the base materials C are made to be a card size in the present embodiment, the vacuum pumping can be performed in a short time in comparison with the conventional technique supposing the takeout of a plurality of cards. After the vacuum pumping, the nozzle operation cylinder 121 slowly moves back, and the suction nozzle 120 is detached from the check valve device 101h.

At this time, because the invasion of the outside air into the base material accommodating section 101c is prohibited by a check function of the check valve device 101h, the prescribed vacuum pressure of the base material accommodating section 101c is kept. Consequently, the connection state with the vacuum pump can be cut when the plate for hot pressing 101 is being conveyed. Moreover, because the exhaust passage 101g is formed inside the lower plate member 101b, the miniaturization and the improvement of portability of the plate for hot pressing 101 can be achieved, and the compact construction in which the check valve device 101h is attached on the side surface of the lower plate member 101b can be adopted.

Figure 8B:
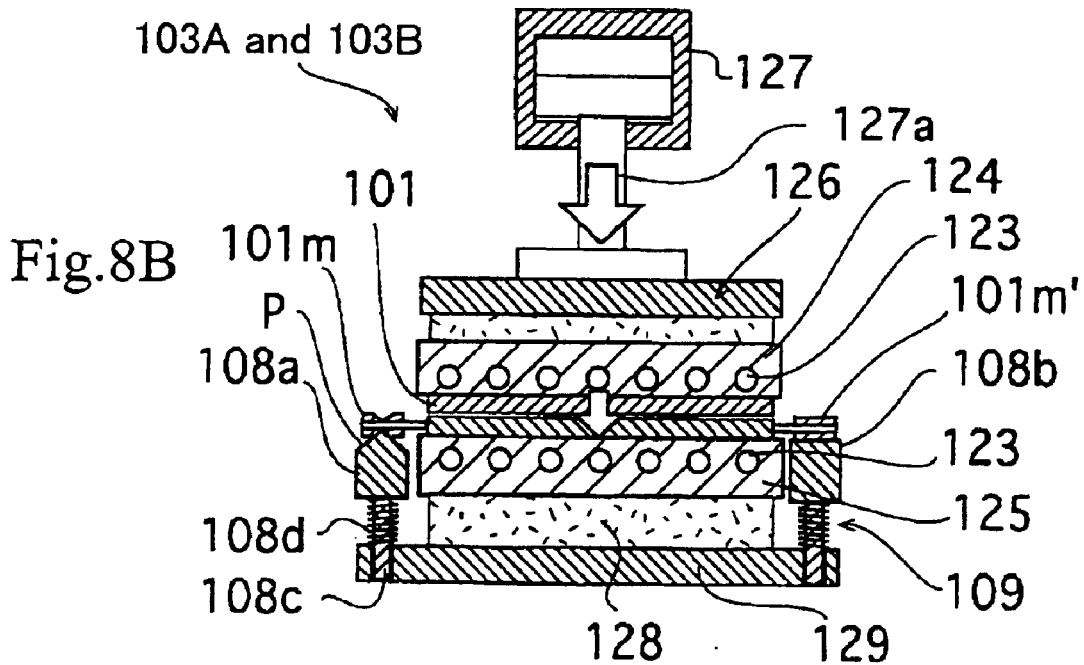

Subsequently, the plate for hot pressing 101 is conveyed to the primary lamination section 103, and primary lamination processing is performed (Step S5). First, in the preheating press section 103A, preheating processing is performed. By reference to FIG. 8A, after the plate for hot pressing 101 has conveyed between the movable hot pressing machine 124 and the fixed hot pressing machine 125, the movable hot pressing machine 124 descends by being driven by the operation cylinder 127 to be contacted with the top surface of the plate for hot pressing 101. And, the guide rail sections 108a and 108b supported by the elastic supporting mechanisms 109 sink by the pushing force from the movable hot pressing machine 124, and the under surface of the plate for hot pressing 101 is contacted with the fixed hot pressing machine 125 (FIG. 8B). Thereby, while the plate for hot pressing 101 is nipped by each of the hot pressing machines 124 and 125 with a prescribed load, the plate 101 is heated by the heat conduction from the hot pressing machines 124 and 125.

The plate for hot pressing 101 subjected to the prescribed preheating processing at the preheating press section 103A is subsequently conveyed to the hot press section 103B. At the hot press section 103B, the prescribed hot press processing of the plate is performed in the similar form to the above, and consequently the thermo-compression bonding of the base materials C (3, 9a and 9b) is performed. After that, the plate for hot pressing is conveyed to the cooling press section 103C, and the prescribed cooling press processing is performed between he movable cooling press machine 131 and the fixed cooling press machine 132. Thereby, the laminated body C1 is manufactured.

In the present embodiment, because the preheating press section 103A, the hot press section 103B and the cooling press section 103C, all constituting the primary lamination section 103, are arranged in series to one another, it becomes possible to deal with additions of the press sections, such as the alteration of the preheating press section 103A to have multi-stages and the alteration of the cooling press section from rapid cooling to gradual cooling to be double, sufficiently only by an extension of the conveyance rail 108A, while the location area occupied by the primary lamination section 103 is made to be small. Thereby, various kinds of press processing corresponding to the combinations of the base material components constituting the laminated bodies C1 can be realized.

Moreover, in the present embodiment, because the conveyance rail 108A is formed by being separated at each of the preheating press section 103A, the hot press section 103B and the cooling press section 103C, influences from pressing operations in other press sections can be removed, and expected press processing can be performed by each press section independently. Thereby, appropriate press processing can be ensured.

When the plate for hot pressing 101 subjected to the primary lamination processing is conveyed to the location part of the operation cylinder 145 equipped with the releasing device 144, the releasing device 144 is connected with the check valve device 101h by the advancing operation of the operation cylinder 145, and then the vacuum holding function by the check valve device 101h is released (FIG. 6, Step S6). Consequently, the base material accommodating section 101c is released to the air. After that, the upper plate member 101a is separated from the lower plate member 101b by a not shown plate holding member.

The laminated body C1 manufactured through the above-described process is made to be a completed body as a product as it is. Otherwise, magnetic stripe layers 10a and 10b, magnetic stripe masking layers 11a and 11b, and outermost packaging printed layers 12a and 12b (see FIG. 19 as to the foregoing) are further collated and laminated on both the surfaces of the laminated body C1. And, after that, each of the plate members 101a and 101b are again superposed thereon to be supplied to the secondary lamination section 104 at the subsequent stage, and then the laminated body C1 is made to be a completed card body C2. In the present embodiment, the latter example is adopted. In the following the example is described.

The collating and the lamination of the magnetic stripe layers 10a and 10b to the laminated body C1 are performed by the use of a not shown but well-known temporarily pasting apparatus. Moreover, the collating and the lamination of the magnetic stripe masking layers 11a and 11b and the outermost packaging printed layers 12a and 12b are implemented by the use of a mechanism having a construction similar to that of the above-described base material transferring mechanism 115 (Step S7). After that, the laminated body C1 is conveyed to the secondary lamination section 104, prescribed hot press processing by the hot press section 104A and prescribed hot press processing by the cooling press section 104B are performed (Step S8). These press conditions can appropriately be set in accordance with the kinds of the base materials to be laminated newly.

The plate for hot pressing 101 subjected to the secondary lamination processing is transferred from the upper conveyance rail 108A to the lower conveyance rail 108B by the hoisting mechanism 151A which has been described by reference to FIGS. 11A–11C. And, when the plate 101 has reached the card takeout section 105, the upper plate member 101a and the lower plate member 101b are separated by the operation of the not shown plate holding member.

In the card takeout section 105, the completed card bodies C2 and C2 are housed in the card receiving magazines 154 on the receiving stand 152 from the top surface of the opened lower plate member 101b through the not shown card transferring mechanism (Step S9). While the completed card bodies C2 are housed in the card receiving magazines 154 of one set, two completed card bodies C2 which have already been housed and laminated in the card receiving magazines 154 of the other set are simultaneously supplied to the card punching apparatus 156 as a set through the conveyance mechanism 155 shown in FIG. 12 to be punched in the standard size of a card, and then the punched card bodies C2 are made to be IC cards 1 being final products (Step S10). When the card receiving magazines 154 of the one set are filled to the brim, the receiving stand 152 rotates by 180 degrees, and the completed card bodies C2 in the card receiving magazines 154 of the one set are supplied to the card punching apparatus 156.

Well, the plate for hot pressing 101 from which the completed card bodies C2 have been taken out progresses in the state in which the plate members 101a and 101b at the upper side and the lower side are separated to be supplied to the cleaning section 106. In the cleaning section 106, the cleaning processing of the nipped surfaces of each of the plate members 101a and 101b are performed by the rotary brush 106A and the gum roller 106B (Step S11). By referring to FIG. 14, first the rotary brush 106A and the gum roller 106B are contacted with upper plate members 101*a*. As for the rotary brush 106A, while it is rotated in the directions of arrows, the rotary brush 106A and the gum roller 106B are moved from the left to the right in the figure. After that, they are moved downward by prescribed distances to be contacted with lower plate members 101*b*. Then, the lower plate members 101*b* are moved from the left to the right in the figure. The dust wiped out and removed by the rotary brush 106A is sent to the dust collector 159, and the other extraneous matter is removed by the gum roller 106B. Thereby, almost all of the nipped surface of each of the plate members 101*a* and 101*b* are cleaned.

The plate members 101*a* and 101*b* on the upper side and the lower side of the plate for hot pressing 101 subjected to the cleaning processing at the cleaning section 106 are once superposed on each other. After that, the plate for hot pressing 101 is transferred from the lower conveyance rail 108B to the upper conveyance rail 108A by the hoisting mechanism 151B. Then, the cleaned top surface of the lower plate member 101*b* is opened by the plate holding member 116, and various base materials C constituting the laminated bodies C1 are supplied by the base material supply section 102.

As above, while a plate for hot pressing 101 circulates on the conveyance path, a series of operations including the supply of the base materials C, the deaeration, the primary lamination, the secondary lamination, the takeout of cards, and the cleaning of the cards is performed. Consequently, the laminated bodies C1 and the completed card bodies C2 are manufactured.

In the present embodiment, because the conveyance path of plates for hot pressing 101 is constructed of the double conveyance rails 108A and 108B on the upper side and the lower side, the occupation volume of the located apparatus can be minimized to contribute to the miniaturization of the apparatus greatly. Moreover, the base material supply section 102, the lamination sections 103 and 104, and the card takeout section 105 can be located at arbitrary positions. Furthermore, because the conveyance means for circulating the plates for hot pressing 101 along the conveyance rails 108A and 108B is composed of the conveyance pushers 118A and 118B, and the hoisting mechanisms 151A and 151B, the construction can be cheap and simple.

In the above, the embodiment of the present invention has been described. Needless to say, the present invention is not limited to the embodiment. Various deformations can be performed on the basis of the technical idea of the present invention.

For example, although the vacuum pumping of the plate for hot pressing 101 is not performed at the time of the lamination processing of the secondary lamination section 104 in the above embodiment, the vacuum pumping of the plate for hot pressing 101 may be performed also at the time of the execution of the secondary lamination processing from the point of view of preventing generation of void faults in the lamination processing of the outermost packaging printed layers. In this case, the vacuum pumping may be realized by making the operation cylinder 145 (FIG. 1) arranged between the primary lamination section 103 and the secondary lamination section 104 perform both of the function of releasing a vacuum and the function of pumping a vacuum, and by disposing a operation cylinder 146 (FIG. 1) which is made to have the function of releasing a vacuum at the subsequent stage of the secondary lamination section 104 specially.

Figure 17:
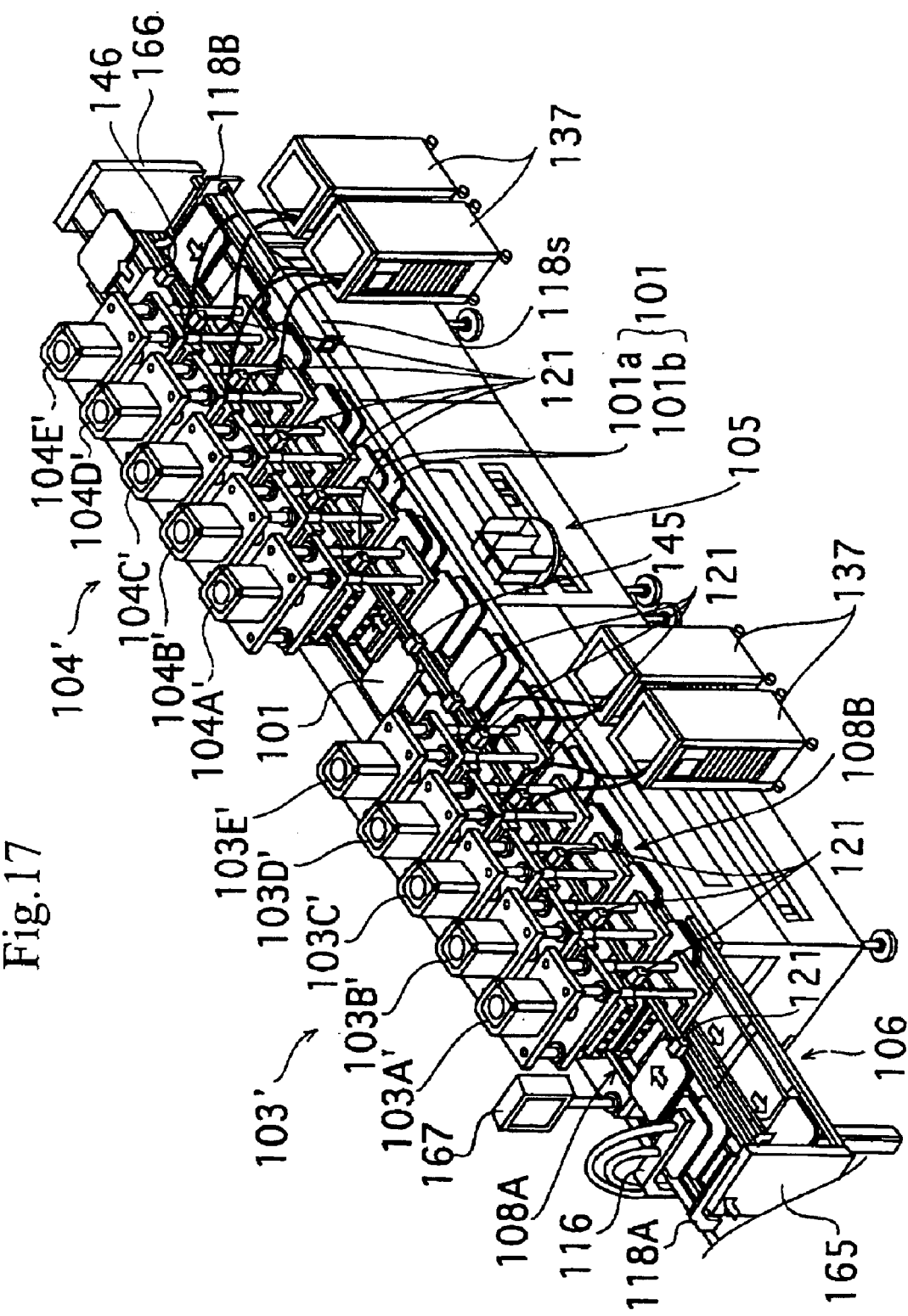
FIG. 17 is a perspective view of a principle part showing an example of a variation of the construction of the card manufacturing apparatus according to the embodiment of the present invention.

Moreover, in the above embodiment, descriptions have been given to an example constructed such that the primary lamination section 103 is composed of the three-stage press sections 103A–103C of preheating, heating and cooling and the secondary lamination section 104 is composed of the two-stage press sections 104A and 104B of heating and cooling. However, the invention is not limited to such a construction, and additions of the press sections and alterations of their dispositions can freely be performed. For example, FIG. 17 shows an example in which each of lamination sections 103' and 104' is composed of a five-stage press section of preheating press sections 103A' and 104A', preheating press sections 103B' and 104B', hot press sections 103C' and 104C', cooling press sections 103D' and 104D', and cooling press sections 103E' and 104E'. Incidentally, in the figure, parts corresponding to those in the above-described first embodiment are designated by the same reference marks, and their detailed descriptions are omitted.

In the example shown in FIG. 17, the preheating press sections and the cooling press sections are additionally provided to make it possible to manufacture various card laminated bodies having different preheating conditions and cooling conditions. Although some kinds of card laminated bodies do not necessarily need the processing of all of the above-mentioned press sections, the operations of the unnecessary press sections may be stopped to make plates pass through them in such a case.

Moreover, in the present example, the nozzle operation cylinders 121, 121, . . . which have a vacuum pumping function are disposed to each of the press sections of the primary lamination section 103' and the secondary lamination section 104'. And thereby, it is made to be possible to perform the vacuum drawing inside the plate for hot pressing 101 before the performance of prescribed press processing in each of the press sections.

Thereby, residual gasses in the base materials C which have been released in each press processing are exhausted to suppress the generation of void faults. In this case, the operation of releasing the vacuum in the plate 101 is performed by the operation cylinders 145 and 146 disposed at the exit of each of the lamination sections 103' and 104'. Incidentally, it is not always necessary to perform the above-mentioned operations in some kinds of cards to be manufactured.

Moreover, in the above embodiment, the construction in which a heater or a heating furnace equipped with an infrared lamp is disposed between the cleaning section 106 and the base material supply section 102 to preheat the plate for hot pressing 101 which is conveyed to the setting position of the heater or the heating furnace to a prescribed temperature can also be adopted easily. In this case, the preheating press section 103A in the primary lamination section 103 can be disused, or the time of processing can be shortened.

Moreover, it is also possible to omit the secondary lamination section 104. In this case, the completed card body C2 can be obtained by collating and laminating the magnetic stripe layers 10*a* and 10*b*, the magnetic stripe masking layers 11*a* and 11*b*, and the outermost packaging printed layers 12*a* and 12*b* in the base material supply section 102. That is, the kind of the base materials C to be supplied from the base material supply section 102 is not limited to those of the above-described embodiment.

Moreover, it is also possible to provide a plate positioning mechanism for positioning the plate for hot pressing 101 to a prescribed position in each press section of the primary lamination section 103 and the secondary lamination section 104 for enhance the reliability of press processing.

From the point of view of enhancing the reliability of press processing, the methods can further be adopted in which the whole press section is covered by a hood for decreasing influences owing to dust in each of the press sections or the movable hot pressing machine 124 and the movable cooling press machine 131 are disposed on the under surface side of the plate for hot pressing 101 to escape the influences of dust generated on the side of the operation cylinders 127 and 134.

Moreover, in the above-described embodiment, the exhaust passage 101g and the check valve device 101h are provided on the side of the lower plate member 101b to the plate for hot pressing 101. However, the present invention is not limited to the embodiment, and the exhaust passage 101g and the check valve device 101h may be provided on the side of the upper plate member 101a. Moreover, the check valve device 101h having the construction schematically shown in FIGS. 18A and 18B may be adopted.

Figure 18A:
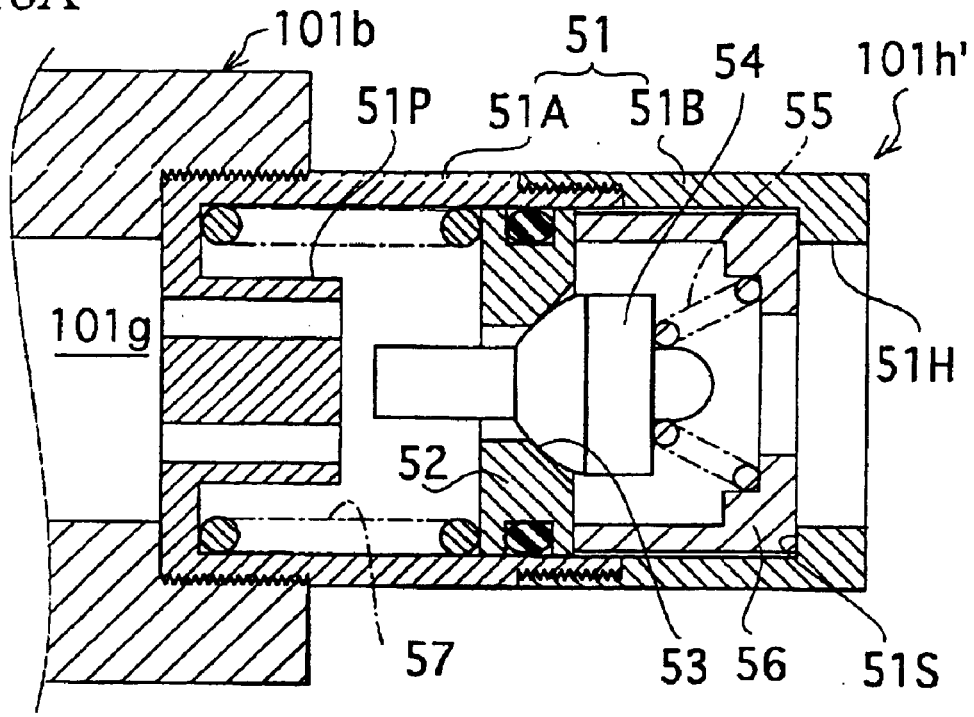
FIG. 18A and FIG. 18B are sectional views illustrating an variation of the construction of a check valve device according to the present invention, and among them
Figure 18B:
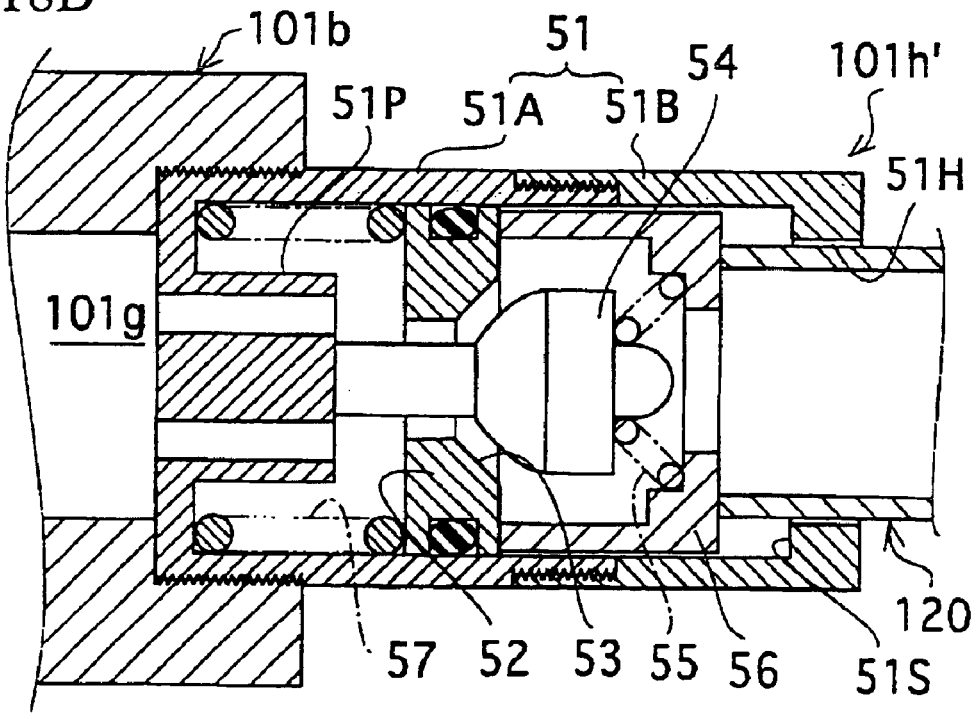

A check valve device 101h' shown in FIGS. 18A and 18B is composed of a casing 51 made of members 51A and 51B joined by being screwed to be airtight, a movable member 52 sliding airtightly on the inside wall surface of the casing 51, a valve sheet 53 formed on the movable member 52, a valve body 54 capable of being separated from or seated to the valve sheet 53, a valve spring 55 energizing the valve body 54 to the valve sheet 53, a retainer 56 supporting one end of the valve spring 55, and a spring member 57 energizing the movable member 52 to the side of the retainer 56. The thus constructed check valve device 101h' is joined by being screwed with a lower plate member 101b airtightly.

The suction nozzle 120 (FIGS. 6 and 18B) is connected with the casing 51 through its opened part 51H. When the suction nozzle 120 is connected, the retainer 56 is pushed to move by the suction nozzle 120, and then the movable member 52 is moved to the left in the figure. The valve body 54 being seated on the valve sheet 53 by being energized by the valve spring 55 moves by a prescribed distance together with the movable member 52. However, by the contact of a shaft portion 54a of the valve body 54 with a projected part 51P of the casing 51, the more movement of the valve body 54 is regulated. Consequently, a further movement of the movable member 52 separates the valve body 54 from the valve sheet 53 at last, and then the check valve device 101h' is opened. In this state, the vacuum drawing of the plate for hot pressing through the exhaust passage 101g is performed. On the other hand, the operation of releasing the vacuum of the plate for hot pressing is also performed in the similar way to the above. The opening of the check valve device 101h' makes the air be introduced from the outside to open the inside of the plate to the air.

As described above, by the present invention, the following effects of (1)–(15) can be obtained.

(1) By the plate for hot pressing, the vacuum pumping of the base material accommodating section can be realized without deforming the plate members. Moreover, by the function of the check valve device, the degree of vacuum of the base material accommodating section can be kept. Consequently, the plate for hot pressing can be conveyed in the state of being separated from the deaeration apparatus.

(2) The miniaturization of the plate for hot pressing and the improvement of the portability thereof can be achieved. Moreover, the construction can be made to be the compact form in which the check valve device is attached to a plate member.

(3) Because the conveyance of the plate for hot pressing to each press section can be performed in the form separated from the deaeration apparatus after the deaeration process has been performed, the degree of freedom of designing the apparatus can greatly be improved. Moreover, because each press section is disposed in series, the present invention can sufficiently deal with the alterations of the arrangement layout of the press sections and additions of the press sections. Consequently, it becomes possible to manufacture various laminated bodies appropriately.

(4) Before and after of press processing, the vacuum pumping of the inside of the plate for hot pressing and the opening of the inside to the air can automatically be performed.

(5) Influences of pressing operations of the other press sections can be eliminated to make each press section perform expected press processing independently. Thereby, appropriate press processing can be ensured.

(6) The regulation of the movement of the plate for hot pressing to a cross direction can be performed. Moreover, even if a discrepancy in the arrangement pitch of the guide rail sections is generated, the plate for hot pressing can appropriately be conveyed.

(7) The conveyance pitches of the plates for hot pressing can easily be adjusted without altering the external forms of the plates.

(8) By forming the conveyance path of the plate for hot pressing in three dimensions and by conveying the plate for hot pressing cyclically, the degree of freedom capable of disposing the base material supply section, the lamination section and the card takeout section arbitrarily is heightened, and thereby it becomes possible to manufacture various kinds of cards by the use of an apparatus.

(9) The conveyance means for conveying the plates for hot pressing can be constructed to be cheap and simple.

(10) Alterations of the arrangement layout of the press section and additions of the press sections can be dealt with sufficiently, and various laminated bodies can be manufactured appropriately.

(11) Another kind of a card can be made by the use of a single apparatus. The requirement for a large item small scale production can sufficiently be dealt with.

(12) While the decrease of a location space is achieved, the collating and the lamination of card constituting base materials can automatically be performed.

(13) Because the sizes of the card constituting base materials are the size of a card, the miniaturization of the plate for hot pressing, the shortening of the period of time of the vacuum pumping of the plate for hot pressing, and the miniaturization of each press section can be achieved. Thereby, the improvement of productivity and the miniaturization of the whole of the apparatus can be achieved.

(14) The rate of occurrences of faults owing to internal contamination of the plate for hot pressing can be decreased, and thereby improvement of the yield of manufacturing cards can be achieved.

(15) It is possible to perform the cleaning processing of the plate members efficiently.

What is claimed is:

1. A hot press apparatus for manufacturing a laminated body of a plurality of collated and laminated base materials by performing preheating processing, hot press processing and cooling processing of a plate for hot pressing comprising a pair of plate members on an upper side and a lower side, said plate members nipping said base materials, said apparatus comprising:

a check valve device for said plate for hot pressing for keeping a vacuum state in a base material accommodating section formed between said pair of plate members;

a preheating press section for performing said preheating processing, a hot press section for performing said hot press processing, and a cooling press section for performing said cooling processing is mutually arranged in a serial state; and a linear conveyance rail for guiding said plate for hot pressing to said preheating press section, said hot press section and said cooling press section in order, wherein said conveyance rail is formed to be separated between each of said preheating press section, said hot press section, and said cooling press section.

2. The hot press apparatus according to claim 1, wherein:

vacuum pumping means connected to said check valve device for performing vacuum pumping inside said base material accommodating section is provided at a preceding stage of said preheating press section; and vacuum releasing means for releasing a vacuum holding function of said check valve device is provided at a subsequent stage of said cooling press section.

3. The hot press apparatus according to claim 1, wherein each separated portion of said conveyance rail comprises:

a base section fixed to a rest system;

a guide rail section for guiding traveling of said plate for hot pressing; and an elastic supporting mechanism for elastically supporting said guide rail section to said base section.

4. The hot press apparatus according to claim 3, characterized in that:

a pair of said guide rail sections is provided correspondingly to guide rollers installed on both sides of said plate for hot pressing; and either of said sets of said pair of guide rollers and said guide rail sections is made to have an engaging relationship.

5. The hot press apparatus according to claim 1, wherein:

a plurality of said plates for hot pressing are conveyed on said conveyance rail; and intervals of said plates, for hot pressing are determined on a basis of a length of a pushing rod provided on an end face on a side of a traveling direction of a plate for hot pressing located on an upstream side.

6. A card manufacturing apparatus for manufacturing a laminated body of a plurality of collated and laminated card constituting base materials by performing prescribed hot press processing of a plate for hot pressing comprising a pair of plate members on an upper side and a lower side, said plate members nipping said base materials, said apparatus comprising:

a check valve device for said plate for hot pressing for keeping a vacuum state inside a base material accommodating section formed between said pair of plate members;

conveyance means for cyclically conveying said plate for hot pressing between upper and lower double conveyance rails;

a base material supply section for collating and laminating said plurality of card constituting base materials between said pair of plate members;

a lamination section for manufacturing said laminated body of said card constituting base materials by performing said prescribed hot press processing of said plate for hot pressing for accommodating said laminated card constituting base materials, said lamination section comprising a preheating press section, a hot press section and a cooling press section, all being arranged in series in an order of processes;

a card takeout section for taking out said laminated body subjected to the hot press processing from said plate for hot pressing; and a linear conveyance rail for guiding said plate for hot pressing to said preheating press section, said hot press section and said cooling press section in order, wherein said conveyance rail is formed to be separated between each of said preheating press section, said hot press section, and said cooling section.

7. The card manufacturing apparatus according claim 6, characterized in that said conveyance means comprises:

a conveyance pusher for pushing said plate or hot pressing located on each step of said upper and lower conveyance rails; and a hoisting mechanism provided between both ends of each step of said conveyance rails for transferring said plate for hot pressing between said conveyance rails.

8. The card manufacturing apparatus according to claim 6, characterized in that said lamination section comprises:

a primary lamination section for performing thermocompression bonding of base constituting materials of said laminated body; and a secondary lamination section for performing thermocompression bonding of at least outermost packaging printed layers on both surfaces of said laminated body.

9. The card manufacturing apparatus according to claim 6, characterized in that said base material supply section comprises:

a plurality of magazines for housing mutual different kinds of said card constituting base materials;

an index table on which said plurality of magazines are located with a prescribed angle interval, said index table being driven to rotate dividedly at said prescribed angle interval;

a base material transferring mechanism for transferring said card constituting base material housed in said magazines to nipped surfaces of said plate member; and a positioning mechanism for positioning and disposing said transferred card constituting base materials to said nipped surfaces of said plate member.

10. The card manufacturing apparatus according to claim 9, characterized in that sizes of said card constituting base materials to be housed in said magazines are made to be a size of a card.

11. The card manufacturing apparatus according to claim 6, said apparatus characterized by comprising a cleaning section provided between said card takeout section and said supply section for cleaning nipped surfaces of said plate member.

12. The card manufacturing apparatus according to claim 11, characterized in that said cleaning section comprises:

a rotation brush connected with dust collection means, said brush wiping out said nipped surface of said plate member; and a gum roller being contacted with said nipped surfaces of said plate member.

* * * * *

UNITED STATES PATENT AND TRADEMARK OFFICE
CERTIFICATE OF CORRECTION

PATENT NO.         : 7,147,027 B2
APPLICATION NO. : 10/297458
DATED                 : December 12, 2006
INVENTOR(S)       : Kenichi Kano and Kimitaka Nishimura It is certified that error appears in the above-identified patent and that said Letters Patent is hereby corrected as shown below:

ON THE TITLE PAGE

Addition of:

--(30) Foreign Application Priority Data

Apr. 6, 2001 (JP)        2001-108455--

Signed and Sealed this

Twenty-seventh Day of February, 2007

JON W. DUDAS
*Director of the United States Patent and Trademark Office*